United States Patent
Wu et al.

(10) Patent No.: US 9,195,051 B2
(45) Date of Patent: Nov. 24, 2015

(54) MULTI-STATE SHUTTER ASSEMBLY FOR USE IN AN ELECTRONIC DISPLAY

(71) Applicant: Pixtronix, Inc., San Diego, CA (US)

(72) Inventors: Joyce Wu, Somerville, MA (US); Tsutomu Kobayashi, Tokyo (JP); Mark B. Andersson, Northborough, MA (US); Gianni Taraschi, Arlington, MA (US); Jasper Lodewyk Steyn, Cupertino, CA (US)

(73) Assignee: Pixtronix, Inc., San Diego, CA (US)

( * ) Notice: Subject to any disclaimer, the term of this patent is extended or adjusted under 35 U.S.C. 154(b) by 0 days.

(21) Appl. No.: 13/841,051

(22) Filed: Mar. 15, 2013

(65) Prior Publication Data

US 2014/0266999 A1   Sep. 18, 2014

(51) Int. Cl.
*G09G 3/34*   (2006.01)
*G02B 26/02*   (2006.01)

(52) U.S. Cl.
CPC .............. *G02B 26/02* (2013.01); *G02B 26/023* (2013.01); *G09G 3/3433* (2013.01)

(58) Field of Classification Search
None
See application file for complete search history.

(56) References Cited

U.S. PATENT DOCUMENTS

| | | | |
|---|---|---|---|
| 4,812,913 A | 3/1989 | Knop et al. | |
| 7,227,677 B2 | 6/2007 | Ravnkilde et al. | |
| 7,304,786 B2 | 12/2007 | Hagood et al. | |
| 7,619,806 B2 | 11/2009 | Hagood, IV et al. | |
| 7,636,189 B2 * | 12/2009 | Hagood et al. | ................ 359/290 |
| 7,772,532 B2 * | 8/2010 | Olsen et al. | ................ 250/208.1 |
| 8,780,104 B2 | 7/2014 | Chuei et al. | |
| 2004/0119376 A1 | 6/2004 | Chou et al. | |
| 2004/0136680 A1 | 7/2004 | Medina et al. | |
| 2008/0278798 A1 | 11/2008 | Hagood et al. | |
| 2010/0164928 A1 | 7/2010 | Shin et al. | |
| 2011/0043882 A1 | 2/2011 | Yoon et al. | |
| 2012/0125543 A1 | 5/2012 | Chambers et al. | |
| 2012/0154455 A1 | 6/2012 | Steyn et al. | |

(Continued)

FOREIGN PATENT DOCUMENTS

| | | |
|---|---|---|
| DE | 102007047010 A1 | 4/2009 |
| EP | 0276337 A1 | 8/1988 |
| EP | 0786679 A2 | 7/1997 |

(Continued)

OTHER PUBLICATIONS

Co-pending U.S. Appl. No. 13/933,962, filed Jul. 2, 2013.

(Continued)

*Primary Examiner* — Joseph Haley
(74) *Attorney, Agent, or Firm* — Edward A. Gordon; Foley & Lardner LLP

(57) ABSTRACT

This disclosure provides systems, methods and apparatus for a multi-state shutter assembly. The multi-state shutter assembly can be used in an electronic display. The shutter assembly can include a movable light obstructing component. The shutter assembly also can include first and second actuators configured to move the light obstructing component between three states, including a fully light obstructive state, a substantially transmissive state, and a partially transmissive state. At least one of the three states is a neutral state in which both the first and second actuators are in an unactuated state. The shutter assembly also can include a controller configured to control the first and second actuator to selectively move the light obstructing component into each of the three states.

27 Claims, 16 Drawing Sheets

(56) References Cited

U.S. PATENT DOCUMENTS

| | | |
|---|---|---|
| 2012/0287509 A1 | 11/2012 | Muneyoshi et al. |
| 2014/0184621 A1 | 7/2014 | Brosnihan et al. |

FOREIGN PATENT DOCUMENTS

| | | |
|---|---|---|
| JP | H06123839 A | 5/1994 |
| JP | 2000111813 A | 4/2000 |
| TW | I220422 B | 8/2004 |
| TW | 200533591 A | 10/2005 |
| TW | 200626477 | 8/2006 |
| WO | 2008102963 A1 | 8/2008 |
| WO | 2012125310 | 9/2012 |
| WO | 2013012732 A2 | 1/2013 |

OTHER PUBLICATIONS

Partial International Search Report—PCT/US2014/022780—ISA/EPO—Jun. 5, 2014.

International Search Report and Written Opinion—PCT/US2014/022780—ISA/EPO—Sep. 26, 2014.

Taiwan Search Report—TW103109309—TIPO—Mar. 23, 2015.

* cited by examiner

MULTI-STATE SHUTTER ASSEMBLY FOR USE IN AN ELECTRONIC DISPLAY

TECHNICAL FIELD

This disclosure relates to the field of displays, and in particular, to fabrication and uses of electromechanical systems (EMS) displays including multi-state light modulators.

DESCRIPTION OF THE RELATED TECHNOLOGY

Electromechanical systems (EMS)-based light modulators can effectively modulate light in a binary fashion, switching between light and dark states. For example, EMS-based shutters can rapidly switch between light transmissive and light blocking states. However, there are few EMS-based light modulators that can reliably achieve discrete partially transmissive states between the fully dark and fully light states.

Thus, displays incorporating EMS-based light modulators tend to generate different grayscale values using principles of time division by driving the light modulators into light or dark states in a series of subframes. Even if such subframes are weighted, such displays may still need to generate a large number of subframes per image frame to obtain the level of grayscale granularity desired.

Certain EMS-based light modulators have been designed with opposing actuators. In practice, such light modulators have only used their two actuated conditions as addressable states. The neutral state, in which neither actuator is actuated, has not been used as an addressable state because such light modulators do not always behave in a reliable, predictable fashion when neither actuator is actuated.

SUMMARY

The systems, methods and devices of the disclosure each have several innovative aspects, no single one of which is solely responsible for the desirable attributes disclosed herein.

One innovative aspect of the subject matter described in this disclosure can be implemented in an apparatus including a movable light obstructing component. The apparatus also can include first and second actuators configured to move the light obstructing component between three states, including a fully light obstructive state, a substantially transmissive state, and a partially transmissive state. At least one of the three states is a neutral state in which both the first and second actuators are in an unactuated state. The apparatus also can include a controller configured to control the first and second actuator to selectively move the light obstructing component into each of the three states.

In some implementations, the apparatus can include a third actuator. When actuated, the third actuator can be configured to maintain the light obstructing component in the neutral state. The third actuator can include an electrode positioned beside or below the position of the light obstructing component in the neutral state. In some implementations, the third actuator can be formed from a transparent conductor. In some implementations, the apparatus also includes a fourth actuator which, when actuated along with the third actuator, is configured to maintain the light obstructing component in the neutral state.

In some implementations, the first and second actuators are further configured to impart opposing linear forces on the light obstructing component substantially within a plane parallel to a substrate over which the light obstructing component is supported when moving the shutter between the substantially transmissive state and the fully light obstructive state. The first actuator can include a first compliant beam electrode coupled to a first corner of the light obstructing component and the second actuator can include a second compliant beam electrode coupled to a second corner of the light obstructing component. The first corner and second corner can be diagonally opposite to one another on the light obstructing component. In some implementations, the apparatus also can include a third actuator, which when actuated, is configured to maintain the light obstructing component in the neutral state. The third actuator can include an electrode positioned beside or below the position of the light obstructing component in the neutral state. The apparatus also can include a fourth actuator which, when actuated along with the third actuator, is configured to maintain the light obstructing component in the neutral state.

In some implementations, the first and second actuators can be configured to rotate the light obstructing component relative to a first aperture. The first aperture can be arranged at an angle with respect to an axis of a display apparatus in which the apparatus is incorporated.

In some implementations, the first light obstructing component is included in a first pixel. The apparatus can include a second light obstructing component in a second pixel adjacent to the first pixel, a third actuator, and a fourth actuator. The third and fourth actuators can be configured to rotate the second light obstructing component relative to a second aperture. The second aperture can be arranged at an angle with respect to the display apparatus axis. The angle of the second aperture can be a mirror image of the angle of the first aperture across an axis of adjacency separating the first and second pixels.

In some implementations, the apparatus also can include a display and a processor that is configured to communicate with the display. The processor also can be configured to process image data. The apparatus also can include a memory device that is configured to communicate with the processor. In some implementations, the apparatus can include a driver circuit configured to send at least one signal to a display and a controller configured to send at least a portion of the image data to the driver circuit. In some implementations, the apparatus can include an image source module configured to send image data to a processor. The image source module can include one or more receivers, transceivers, or transmitters. In some implementations, the apparatus also can include an input device configured to receive input data and to communicate the input data to a processor.

Another innovative aspect of the subject matter described in this disclosure can be implemented in an apparatus including a movable light obstructing component. The apparatus also can include first and second actuators coupled to the apparatus and configured to move the light obstructing component linearly between a first state and a second state and rotationally between the second state and a third state.

In some implementations, the first state is a substantially transmissive state, the second state is a fully light obstructive state, and the third state is a partially transmissive state. In some implementations, the substantially transmissive state can be achieved by applying a first voltage to the first actuator, the fully light obstructive state can be achieved by applying a second voltage to the second actuator, and the partially transmissive state can be achieved by applying a third voltage to the second actuator. In some implementations, the third voltage is greater than the second voltage. The first and second actuators each can include a compliant beam electrode having a hinge coupling a load beam of the electrode to the light obstructing component.

In some implementations, the apparatus can include first and second mechanical stops coupled to the light obstructing component. The first and second mechanical stops can be configured to restrict the motion of the light obstructing component towards the first and second actuators, respectively. In some implementations, the apparatus also can include a third actuator, which when actuated, can be configured to maintain the light obstructing component in the neutral state. The third actuator can include an electrode positioned beside or below the position of the light obstructing component in the neutral state. In some implementations, the third actuator can be formed from a transparent conductor. In some implementations, the apparatus also can include a fourth actuator which, when actuated along with the third actuator, can be configured to maintain the light obstructing component in the neutral state.

In some implementations, the first actuator includes a first compliant beam electrode coupled to a first corner of the light obstructing component and the second actuator includes a second compliant beam electrode coupled to a second corner of the light obstructing component. The first corner and the second corner can be diagonally opposite to one another on the light obstructing component.

In some implementations, the apparatus can include a third actuator, which when actuated, is configured to maintain the light obstructing component in the neutral state. The third actuator can include an electrode positioned beside or below the position of the light obstructing component in the neutral state. The apparatus also can include a fourth actuator which, when actuated along with the third actuator, can be configured to maintain the light obstructing component in the neutral state. In some implementations, the first and second actuators are configured to rotate the light obstructing component relative to a first aperture. The first aperture can be arranged at an angle with respect to an axis of a display apparatus in which the apparatus is incorporated.

Details of one or more implementations of the subject matter described in this specification are set forth in the accompanying drawings and the description below. Although the examples provided in this summary are primarily described in terms of MEMS-based displays, the concepts provided herein may apply to other types of displays, such as liquid crystal displays (LCDs), organic light emitting diode (OLED) displays, electrophoretic displays, and field emission displays, as well as to other non-display MEMS devices, such as MEMS microphones, sensors, and optical switches. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1A:
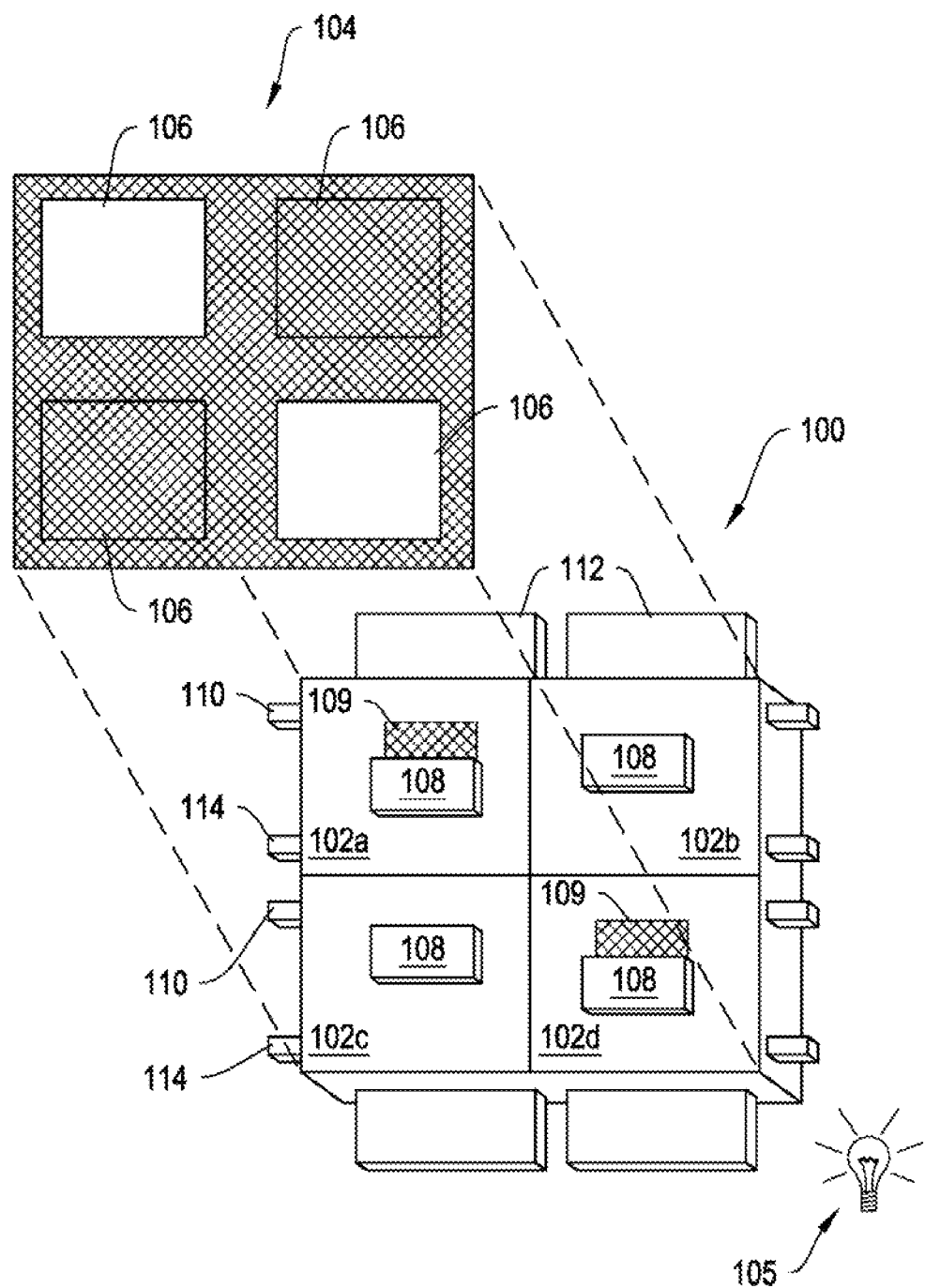
FIG. 1A shows a schematic diagram of an example direct-view microelectromechanical systems (MEMS) based display apparatus.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that can be configured to display an image, whether in motion (such as video) or stationary (such as still images), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (such as e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Dual actuator light modulators having reliable, stable neutral positions can be provided to enable such dual actuator light modulators to reliably enter, and remain in, a third stable state. If this third stable state is used as an intermediate state between a fully light and a fully dark state, such light modulators can implement time division grayscale schemes using fewer subframes than light modulators only capable of binary operation.

In some implementations, a dual actuator light modulator can be configured to achieve the stable third state through the addition of a holding actuator. For example, if the light modulator includes a conductive shutter, the shutter can serve as one electrode of an electrostatic holding actuator. A second electrode positioned proximate the shutter's desired neutral position can be used as an opposing electrode. The second electrode can be positioned beside or beneath the shutter's desired neutral position.

In some other implementations, the two opposing actuators coupled to the shutter can be configured to reliably return the shutter to its intended neutral position. For example, for a rectangular shutter, the opposing actuators can include respective compliant load beams that couple to diagonally opposite corners of the shutter. This actuator configuration can cause the shutter to move rotationally when one of the actuators is actuated while the other is unactuated. In addition, when one actuator transitions from an actuated state to an unactuated state while the other actuator transitions from a unactuated state to an actuated state, the shutter can translate substantially linearly. In some implementations, an aperture can be arranged at an angle relative to the shutter. Combinations of translational and rotational movement of the shutter as described above can allow for at least three stable states of the light modulator, including a fully transmissive state, a fully light obstructing state, and a partially transmissive state.

In some implementations, a dual actuator light modulator can include load beams that include hinges. A first voltage applied to a drive actuator can cause the actuator to pull the shutter into a first position corresponding to a fully light obstructing state. Applying a second voltage greater than the first voltage to the drive beam can cause the shutter to move into a different position corresponding to a partially transmissive state. A substantially transmissive state can be achieved by applying a voltage to a second actuator.

Particular implementations of the subject matter described in this disclosure can be implemented to realize one or more of the following potential advantages. By incorporating opposing actuators having a stable neutral state, a shutter assembly can be configured to enter into at least three states, an open, light-transmissive state, a closed, light obstructing state, and a partially open, partially transmissive state. The various states of the shutter assembly can be achieved by changing the configuration of the actuators. In some implementations, the actuators may couple to the shutter at diagonally opposite corners, allowing the shutter to be moved rotationally or linearly. In some other implementations, the actuators may include hinges which allow the shutter to be moved into different positions depending on the voltage level applied across the beams of an actuator. By including shutter assemblies that can achieve three stable states, a display apparatus can form an image using fewer subframes.

In some implementations, the shutter of a light modulator can be arranged at an angle with respect to an aperture, and the aperture can be at an angle with respect to the display axes, i.e., with respect to the rows and columns. Each shutter assembly can represent a pixel of an electronic display, and the angles of the apertures in adjacent pixels with respect to the display axes can vary. In some implementations, the angle of the aperture in one pixel with respect to the display axes can be a mirror image of the angle of the aperture in an adjacent pixel. For example, the angles of apertures in pixels in adjacent rows or adjacent columns can be mirrored in the adjacent row or column. The angular configuration of the apertures can improve the pixel density or viewing angle uniformity of the electronic display. In some other implementations, the angles of apertures in adjacent pixels can be the same.

FIG. 1A shows a schematic diagram of an example direct-view MEMS-based display apparatus 100. The display apparatus 100 includes a plurality of light modulators 102a-102d (generally "light modulators 102") arranged in rows and columns. In the display apparatus 100, the light modulators 102a and 102d are in the open state, allowing light to pass. The light modulators 102b and 102c are in the closed state, obstructing the passage of light. By selectively setting the states of the light modulators 102a-102d, the display apparatus 100 can be utilized to form an image 104 for a backlit display, if illuminated by a lamp or lamps 105. In another implementation, the apparatus 100 may form an image by reflection of ambient light originating from the front of the apparatus. In another implementation, the apparatus 100 may form an image by reflection of light from a lamp or lamps positioned in the front of the display, i.e., by use of a front light.

In some implementations, each light modulator 102 corresponds to a pixel 106 in the image 104. In some other implementations, the display apparatus 100 may utilize a plurality of light modulators to form a pixel 106 in the image 104. For example, the display apparatus 100 may include three color-specific light modulators 102. By selectively opening one or more of the color-specific light modulators 102 corresponding to a particular pixel 106, the display apparatus 100 can generate a color pixel 106 in the image 104. In another example, the display apparatus 100 includes two or more light modulators 102 per pixel 106 to provide a luminance level in an image 104. With respect to an image, a "pixel" corresponds to the smallest picture element defined by the resolution of image. With respect to structural components of the display apparatus 100, the term "pixel" refers to the combined mechanical and electrical components utilized to modulate the light that forms a single pixel of the image.

The display apparatus 100 is a direct-view display in that it may not include imaging optics typically found in projection applications. In a projection display, the image formed on the surface of the display apparatus is projected onto a screen or onto a wall. The display apparatus is substantially smaller than the projected image. In a direct view display, the user sees the image by looking directly at the display apparatus, which contains the light modulators and optionally a backlight or front light for enhancing brightness and/or contrast seen on the display.

Direct-view displays may operate in either a transmissive or reflective mode. In a transmissive display, the light modulators filter or selectively block light which originates from a lamp or lamps positioned behind the display. The light from the lamps is optionally injected into a lightguide or "backlight" so that each pixel can be uniformly illuminated. Transmissive direct-view displays are often built onto transparent or glass substrates to facilitate a sandwich assembly arrangement where one substrate, containing the light modulators, is positioned over the backlight.

Each light modulator 102 can include a shutter 108 and an aperture 109. To illuminate a pixel 106 in the image 104, the shutter 108 is positioned such that it allows light to pass through the aperture 109 towards a viewer. To keep a pixel 106 unlit, the shutter 108 is positioned such that it obstructs the passage of light through the aperture 109. The aperture 109 is defined by an opening patterned through a reflective or light-absorbing material in each light modulator 102.

The display apparatus also includes a control matrix connected to the substrate and to the light modulators for controlling the movement of the shutters. The control matrix includes a series of electrical interconnects (such as interconnects 110, 112 and 114), including at least one write-enable interconnect 110 (also referred to as a "scan-line interconnect") per row of pixels, one data interconnect 112 for each column of pixels, and one common interconnect 114 providing a common voltage to all pixels, or at least to pixels from both multiple columns and multiples rows in the display apparatus 100. In response to the application of an appropriate voltage (the "write-enabling voltage, $V_{WE}$"), the write-enable interconnect 110 for a given row of pixels prepares the pixels in the row to accept new shutter movement instructions. The data interconnects 112 communicate the new movement instructions in the form of data voltage pulses. The data voltage pulses applied to the data interconnects 112, in some implementations, directly contribute to an electrostatic movement of the shutters. In some other implementations, the data voltage pulses control switches, such as transistors or other non-linear circuit elements that control the application of separate actuation voltages, which are typically higher in magnitude than the data voltages, to the light modulators 102. The application of these actuation voltages then results in the electrostatic driven movement of the shutters 108.

Figure 1B:
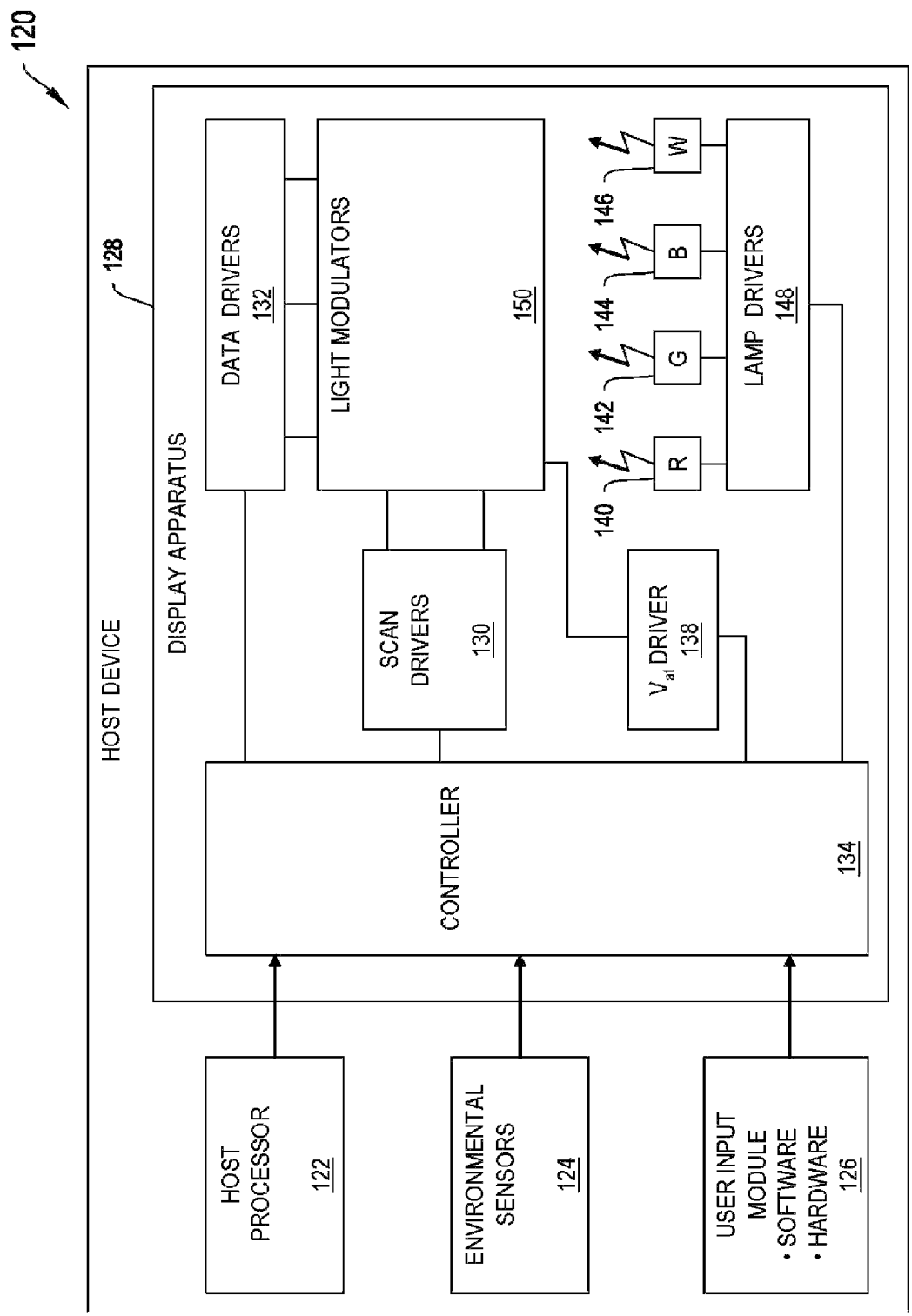
FIG. 1B shows a block diagram of an example host device.

FIG. 1B shows a block diagram of an example host device 120 (i.e., cell phone, smart phone, PDA, MP3 player, tablet, e-reader, netbook, notebook, etc.). The host device 120 includes a display apparatus 128, a host processor 122, environmental sensors 124, a user input module 126, and a power source.

The display apparatus 128 includes a plurality of scan drivers 130 (also referred to as "write enabling voltage sources"), a plurality of data drivers 132 (also referred to as "data voltage sources"), a controller 134, common drivers 138, lamps 140-146, lamp drivers 148 and an array 150 of display elements, such as the light modulators 102 shown in FIG. 1A. The scan drivers 130 apply write enabling voltages to scan-line interconnects 110. The data drivers 132 apply data voltages to the data interconnects 112.

In some implementations of the display apparatus, the data drivers 132 are configured to provide analog data voltages to the array 150 of display elements, especially where the luminance level of the image 104 is to be derived in analog fashion. In analog operation, the light modulators 102 are designed such that when a range of intermediate voltages is applied through the data interconnects 112, there results a range of intermediate open states in the shutters 108 and therefore a range of intermediate illumination states or luminance levels in the image 104. In other cases, the data drivers 132 are configured to apply only a reduced set of 2, 3 or 4 digital voltage levels to the data interconnects 112. These voltage levels are designed to set, in digital fashion, an open state, a closed state, or other discrete state to each of the shutters 108.

The scan drivers 130 and the data drivers 132 are connected to a digital controller circuit 134 (also referred to as the "controller 134"). The controller sends data to the data drivers 132 in a mostly serial fashion, organized in sequences, which may be predetermined, grouped by rows and by image frames. The data drivers 132 can include series to parallel data converters, level shifting, and for some applications digital to analog voltage converters.

The display apparatus optionally includes a set of common drivers 138, also referred to as common voltage sources. In some implementations, the common drivers 138 provide a DC common potential to all display elements within the array 150 of display elements, for instance by supplying voltage to a series of common interconnects 114. In some other implementations, the common drivers 138, following commands from the controller 134, issue voltage pulses or signals to the array 150 of display elements, for instance global actuation pulses which are capable of driving and/or initiating simultaneous actuation of all display elements in multiple rows and columns of the array 150.

All of the drivers (such as scan drivers 130, data drivers 132 and common drivers 138) for different display functions are time-synchronized by the controller 134. Timing commands from the controller coordinate the illumination of red, green, blue and white lamps (140, 142, 144 and 146 respectively) via lamp drivers 148, the write-enabling and sequencing of specific rows within the array 150 of display elements, the output of voltages from the data drivers 132, and the output of voltages that provide for display element actuation. In some implementations, the lamps are light emitting diodes (LEDs).

The controller 134 determines the sequencing or addressing scheme by which each of the shutters 108 can be re-set to the illumination levels appropriate to a new image 104. New images 104 can be set at periodic intervals. For instance, for video displays, the color images 104 or frames of video are refreshed at frequencies ranging from 10 to 300 Hertz (Hz). In some implementations the setting of an image frame to the array 150 is synchronized with the illumination of the lamps 140, 142, 144 and 146 such that alternate image frames are illuminated with an alternating series of colors, such as red, green, blue and white. The image frames for each respective color are referred to as color subframes. In this method, referred to as the field sequential color method, if the color subframes are alternated at frequencies in excess of 20 Hz, the human brain will average the alternating frame images into the perception of an image having a broad and continuous range of colors. In alternate implementations, four or more lamps with primary colors can be employed in display apparatus 100, employing primaries other than red, green, blue and white.

In some implementations, where the display apparatus 100 is designed for the digital switching of shutters 108 between open and closed states, the controller 134 forms an image by the method of time division grayscale, as previously described. In some other implementations, the display apparatus 100 can provide grayscale through the use of multiple shutters 108 per pixel.

In some implementations, the data for an image 104 state is loaded by the controller 134 to the display element array 150 by a sequential addressing of individual rows, also referred to as scan lines. For each row or scan line in the sequence, the scan driver 130 applies a write-enable voltage to the write enable interconnect 110 for that row of the array 150, and subsequently the data driver 132 supplies data voltages, corresponding to desired shutter states, for each column in the selected row. This process repeats until data has been loaded for all rows in the array 150. In some implementations, the sequence of selected rows for data loading is linear, proceeding from top to bottom in the array 150. In some other implementations, the sequence of selected rows is pseudo-randomized, in order to minimize visual artifacts. And in some other implementations, the sequencing is organized by blocks, where, for a block, the data for only a certain fraction of the image 104 state is loaded to the array 150, for instance by addressing only every 5$^{th}$ row of the array 150 in sequence.

In some implementations, the process for loading image data to the array 150 is separated in time from the process of actuating the display elements in the array 150. In these implementations, the display element array 150 may include data memory elements for each display element in the array 150 and the control matrix may include a global actuation interconnect for carrying trigger signals, from common driver 138, to initiate simultaneous actuation of shutters 108 according to data stored in the memory elements.

In alternative implementations, the array 150 of display elements and the control matrix that controls the display elements may be arranged in configurations other than rectangular rows and columns. For example, the display elements can be arranged in hexagonal arrays or curvilinear rows and columns. In general, as used herein, the term scan-line shall refer to any plurality of display elements that share a write-enabling interconnect.

The host processor 122 generally controls the operations of the host. For example, the host processor 122 may be a general or special purpose processor for controlling a portable electronic device. With respect to the display apparatus 128, included within the host device 120, the host processor 122 outputs image data as well as additional data about the host. Such information may include data from environmental sensors, such as ambient light or temperature; information about the host, including, for example, an operating mode of the host or the amount of power remaining in the host's power source; information about the content of the image data; information about the type of image data; and/or instructions for display apparatus for use in selecting an imaging mode.

The user input module 126 conveys the personal preferences of the user to the controller 134, either directly, or via the host processor 122. In some implementations, the user input module 126 is controlled by software in which the user programs personal preferences such as "deeper color," "better contrast," "lower power," "increased brightness," "sports," "live action," or "animation." In some other implementations, these preferences are input to the host using hardware, such as a switch or dial. The plurality of data inputs to the controller 134 direct the controller to provide data to the various drivers 130, 132, 138 and 148 which correspond to optimal imaging characteristics.

An environmental sensor module 124 also can be included as part of the host device 120. The environmental sensor module 124 receives data about the ambient environment, such as temperature and or ambient lighting conditions. The sensor module 124 can be programmed to distinguish whether the device is operating in an indoor or office environment versus an outdoor environment in bright daylight versus an outdoor environment at nighttime. The sensor module 124 communicates this information to the display controller 134, so that the controller 134 can optimize the viewing conditions in response to the ambient environment.

Figure 2A:
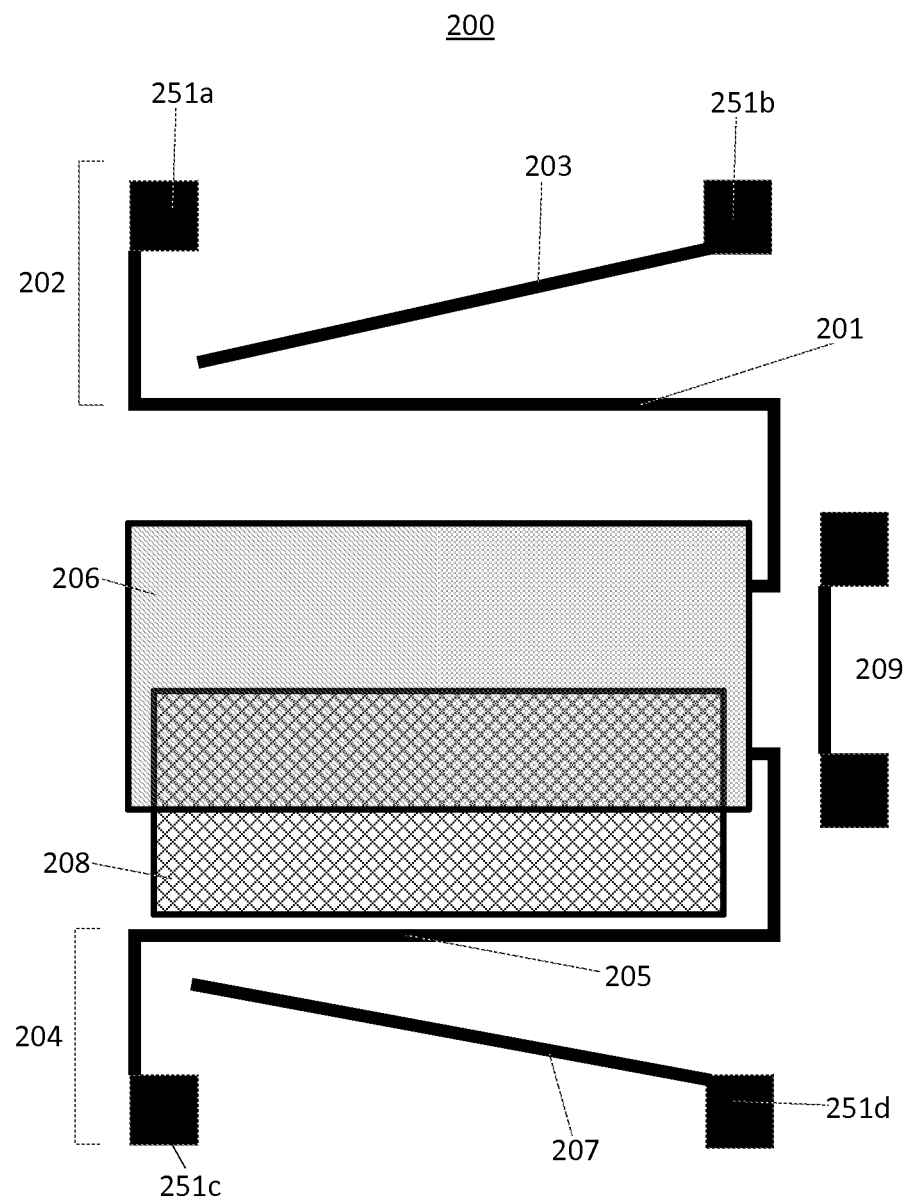
FIG. 2A shows a top view of an example three-state shutter assembly in a partially transmissive state.

FIG. 2A shows a top view of an example three-state shutter assembly 200 in a partially transmissive state. The shutter assembly 200 includes opposing actuators 202 and 204 coupled to a shutter 206. Each actuator 202 and 204 includes two beams 201 and 203 and 205 and 207, respectively. The shutter assembly 200 also includes an aperture 208 and a holding electrode 209. The shutter 206 is positioned above the aperture 208. The shutter 206 is depicted as being partially transparent so that the position of the aperture 208 can be seen beneath the shutter 206. In practice, however, the shutter 206 is opaque, so that light in its path is substantially entirely obstructed.

The actuators 202 and 204 are compliant beam actuators. The actuators 202 and 204 move the shutter 206 by driving the shutter 206 substantially in a plane parallel to a surface of a substrate (not shown) over which the shutter 206 is suspended by applying a voltage greater or equal to the actuation voltage across the beams 205 and 207 of the actuator 204 or across the beams 201 and 203 of the actuator 202. Suitable actuation voltages range from about 10 V to about 45 V. The beams 203 and 207 are secured by the anchors 251$b$ and 251$d$, respectively. The shutter 206 is suspended a short distance over the aperture 208 by anchors 251$a$ and 251$c$ attached to the beams 201 and 205, respectively. The beams 201 and 205 couple to the edges of the shutter 206, confining the motion of the shutter 206 substantially to a plane parallel to the plane of the substrate. In some implementations, the beams 201 and 205 are made from a flexible material that can deform when either of the actuators 202 and 204 is actuated to facilitate a zipping actuation motion. In some implementations, the actuation of the actuators 202 and 204 can be controlled by a voltage driver. For example, the shutter assembly 200 can be an element of the array of light modulators 150 shown in FIG. 1B. The controller 134 can communicate instructions to the voltage driver 138 shown in FIG. 1B, which can then apply actuation voltages to the shutter assembly 200. Through such communication, the controller 134 can cause the actuators 202 and 204 of the shutter assembly 200 to achieve a neutral (or relaxed) partially transmissive state, a fully closed state, and a substantially open or light transmissive state.

In some implementations, the shutter assembly 200 is part of an electronic display module. For example, the shutter assembly 200 can represent a single pixel of a display. In some implementations, a backlight shines through the aperture 208 and can contribute to the formation of the image. The shutter 206 can be positioned to obstruct a portion of the light leaving the aperture 208, thereby affecting the level of light seen by a viewer of the display. A dark pixel can be created by fully closing the shutter 206 and a bright pixel can be created by fully opening the shutter 206. Intermediate levels of brightness can be displayed by partially closing the shutter 206, allowing only a portion of the light passing through the aperture 208 to leave the display module to form an image.

The shutter assembly 200 is shown in a neutral state in FIG. 2A, with neither of the opposing actuators 202 and 204 activated. In this state, the shutter 206 partially obstructs the aperture 208. In some implementations, in this partially transmissive state, the shutter 206 allows approximately 50% of the light passing through the aperture 208 to exit the display and contribute to the formation of an image. In some other implementations, the shutter assembly 200 is configured to allow different percentages of light to leave the display while in this partially transmissive state. For example, the shutter assembly 200 can be configured to allow about 10%, 25%, 33%, 50%, 66%, 75%, 90%, or any other percentage of the light passing through the aperture 208 to leave the display when the shutter assembly 200 is in a neutral state.

The shutter assembly 200 includes a holding electrode 209 to help maintain the neutral position of the shutter 206. In some implementations, the holding electrode 209 is fabricated on the same substrate and as part of the same process used to fabricate the shutter assembly 200. For example, the shutter 206 can be formed from a conductive material and can be substantially aligned in the same plane as the holding electrode 209. The shutter 206 and the holding electrode 209 can therefore exert an electrostatic force on each other when a voltage is applied across them.

The position of the holding electrode 209 can be selected to align with the desired neutral position of the shutter 206. Thus, when the opposing actuators 202 and 204 are deactivated, allowing the shutter 206 to move to its neutral position, the side actuator 209 can be activated. Activation of the side actuator 209 can result in a faster transition of the shutter 206 to its neutral state and more precise control over the resting position of the shutter 206 in its neutral state.

In some implementations, the shutter assembly 200 is configured such that the shutter 206 is prevented from moving towards the holding electrode 209 when the holding electrode 209 is activated. For example, a relatively small magnitude voltage can be selected for the voltage to be applied across the shutter 206 and the holding electrode 209, so that the resulting electrostatic force draws the shutter 206 to be aligned with the holding electrode 209, but does not draw the shutter 206 towards the holding electrode 209, or at least reduces such movement. In some implementations, suitable voltages to be applied to the holding electrode 209 range from about 1.0 V to about 3.0 V. Prevention of shutter movement towards the holding electrode 209 can be achieved in other ways. For example, the beams 201 and 205 may be constructed to restrict the movement of the shutter 206 in the direction of the holding electrode 209, or the holding electrode 209 can be placed a relatively large distance away from the edge of the shutter 206.

Figure 2B:
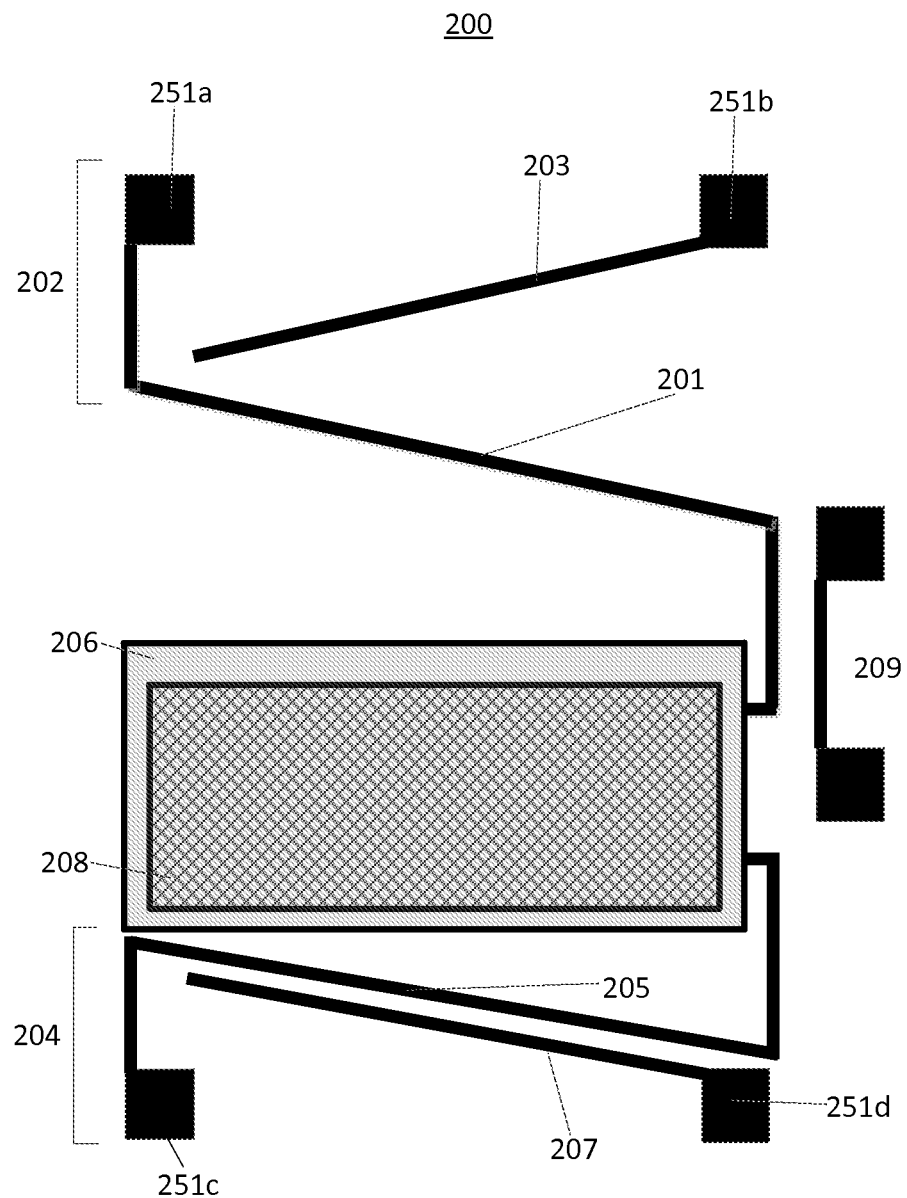
FIG. 2B shows a top view of the three-state shutter assembly shown in FIG. 2A in a fully light blocking state.

FIG. 2B shows a top view of the three-state shutter assembly 200 shown in FIG. 2A in a fully light obstructing state. The shutter 206 is positioned directly over the aperture 208 so that substantially none of the light passing through the aperture 208 is able to escape from the display in which the shutter assembly 200 is used. As in FIG. 2A, for illustrative purposes, the shutter 206 is depicted as transparent in FIG. 2B, despite it being substantially opaque in practice.

The actuators 202 and 204 each include a pair of electrodes which can move the shutter 206 via an electrostatic force. For example, applying a voltage across the actuator 204 creates an electrostatic force that tends to draw the two beams 205 and 207 of the actuator 204 together.

Figure 2C:
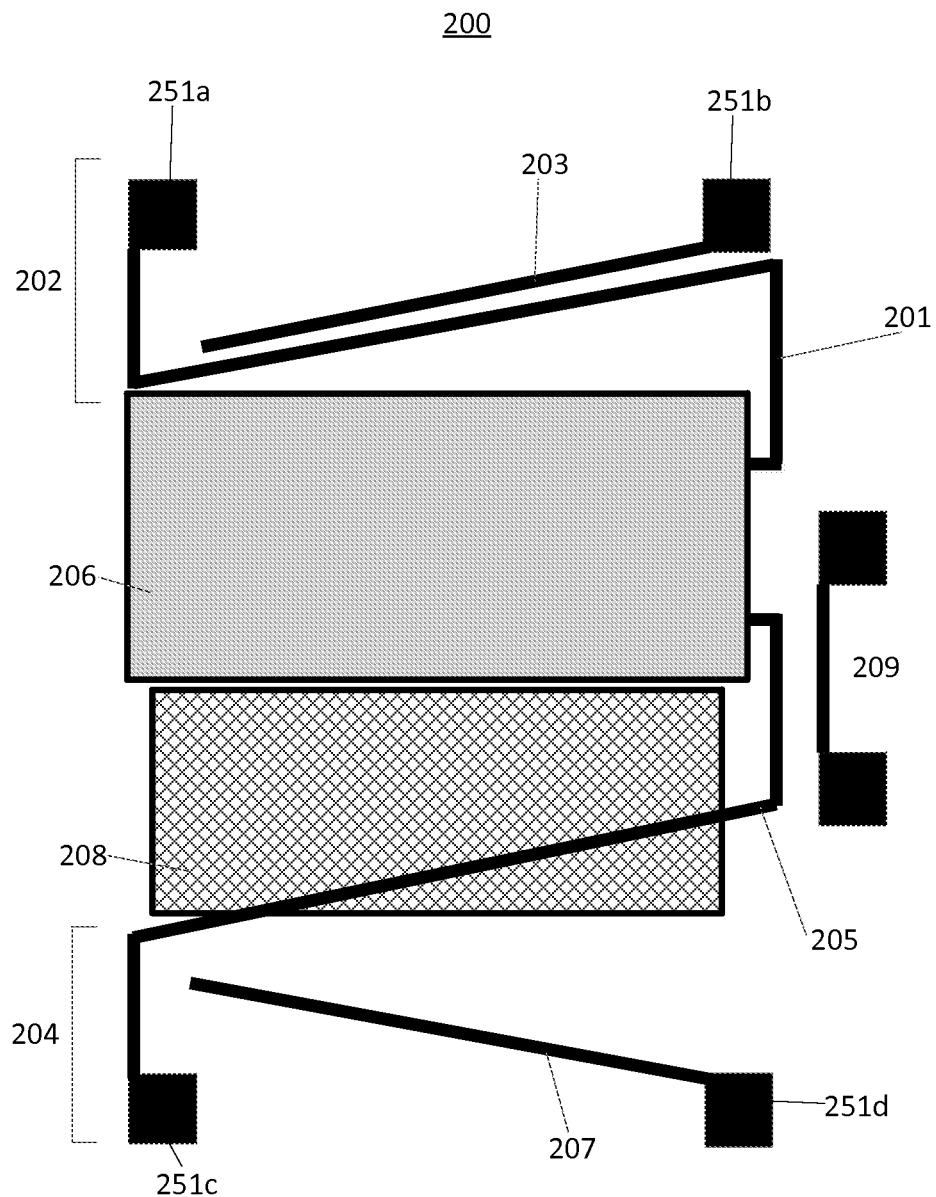
FIG. 2C shows a top view of the three-state shutter assembly shown in FIG. 2A in a substantially transmissive state.

FIG. 2C shows a top view of the three-state shutter assembly 200 shown in FIG. 2A in a substantially transmissive state. No portion of the shutter 206 is positioned over the aperture 208. Therefore, substantially all of the light passing through the aperture 208 is able to escape from the display in which the shutter assembly 200 is used.

Figure 2D:
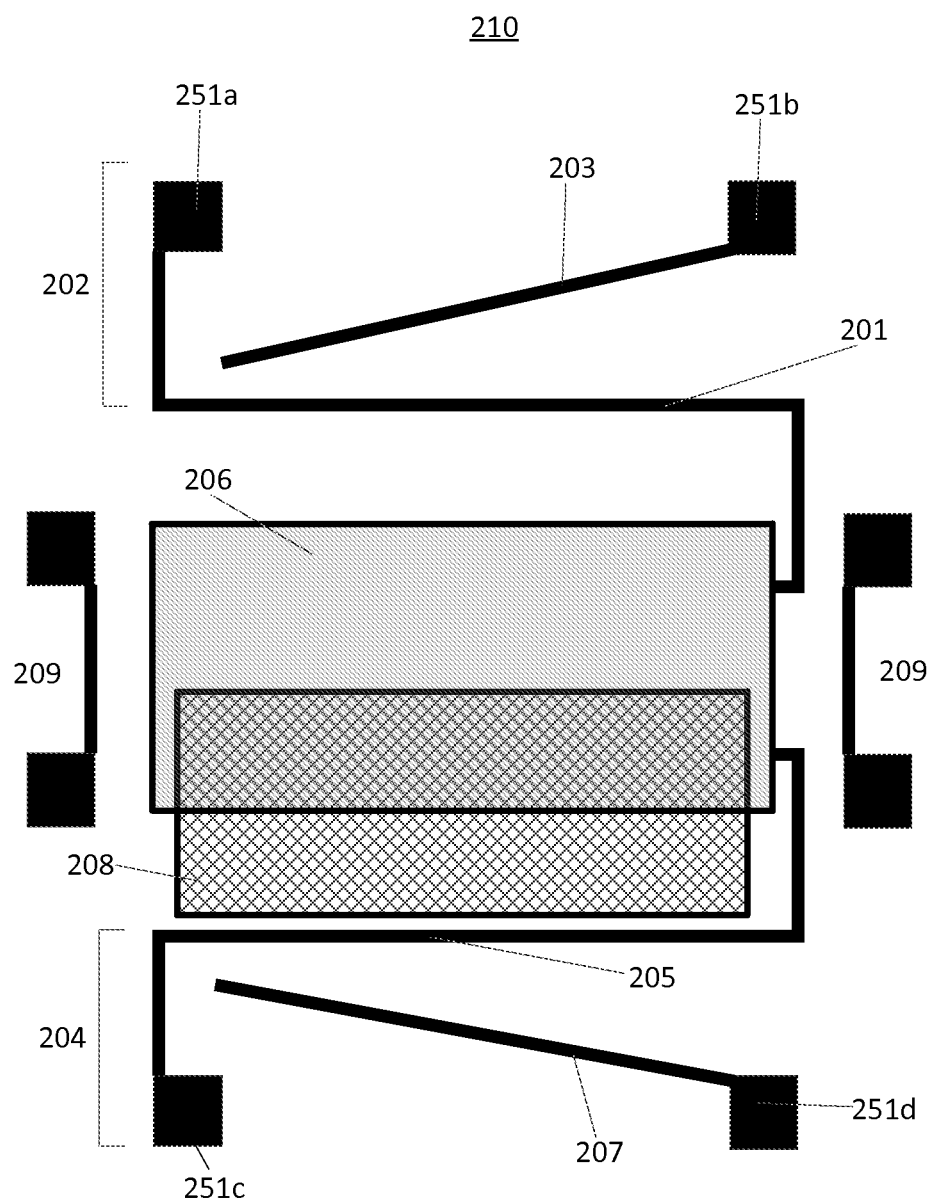
FIGS. 2D and 2E show top views of alternative three-state shutter assemblies.

FIG. 2D shows a top view of an alternative three-state shutter assembly 210. The shutter assembly 210 is similar to the shutter assembly 200 shown in FIGS. 2A-2C. In contrast to the shutter assembly 200 shown in FIG. 2A-2C, the shutter assembly 210 includes a pair of holding electrodes 219, one on either side of the shutter 206. FIG. 2D shows the shutter assembly 210 in a partially transmissive state.

The shutter assembly 210 can be moved into a stable fully transmissive state by applying a voltage across the actuator 202, as discussed above in connection with FIG. 2C. Similarly, the shutter assembly 210 can be moved into a stable fully light obstructing state by applying a voltage across the actuator 204, as discussed above in connection with FIG. 2B. In the partially transmissive state shown in FIG. 2D, voltage is removed from both opposing actuators 202 and 204 and a voltage is applied to both of the holding electrodes 219. The shutter 206 is conductive, and can form an opposing electrode of an electrostatic actuator with each of the holding electrodes 219. In some implementations, the stability of the shutter 206 in the partially transmissive state can be increased by applying an equal voltage to each of the holding electrodes 219 and by positioning the holding electrodes 219 such that they are each separated by an equal distance from opposite edges of the shutter 206. Such a configuration can help to reduce undesired movement of the shutter 206 in the partially transmissive state. In some implementations, the voltages applied to the respective holding electrodes 219 or the spacing between the respective holding electrodes 219 and the shutter 206 is different to account for any variations in stiffness in the shutter assembly with respect to lateral movement of the shutter 206 towards the opposing holding electrodes 219.

Figure 2E:
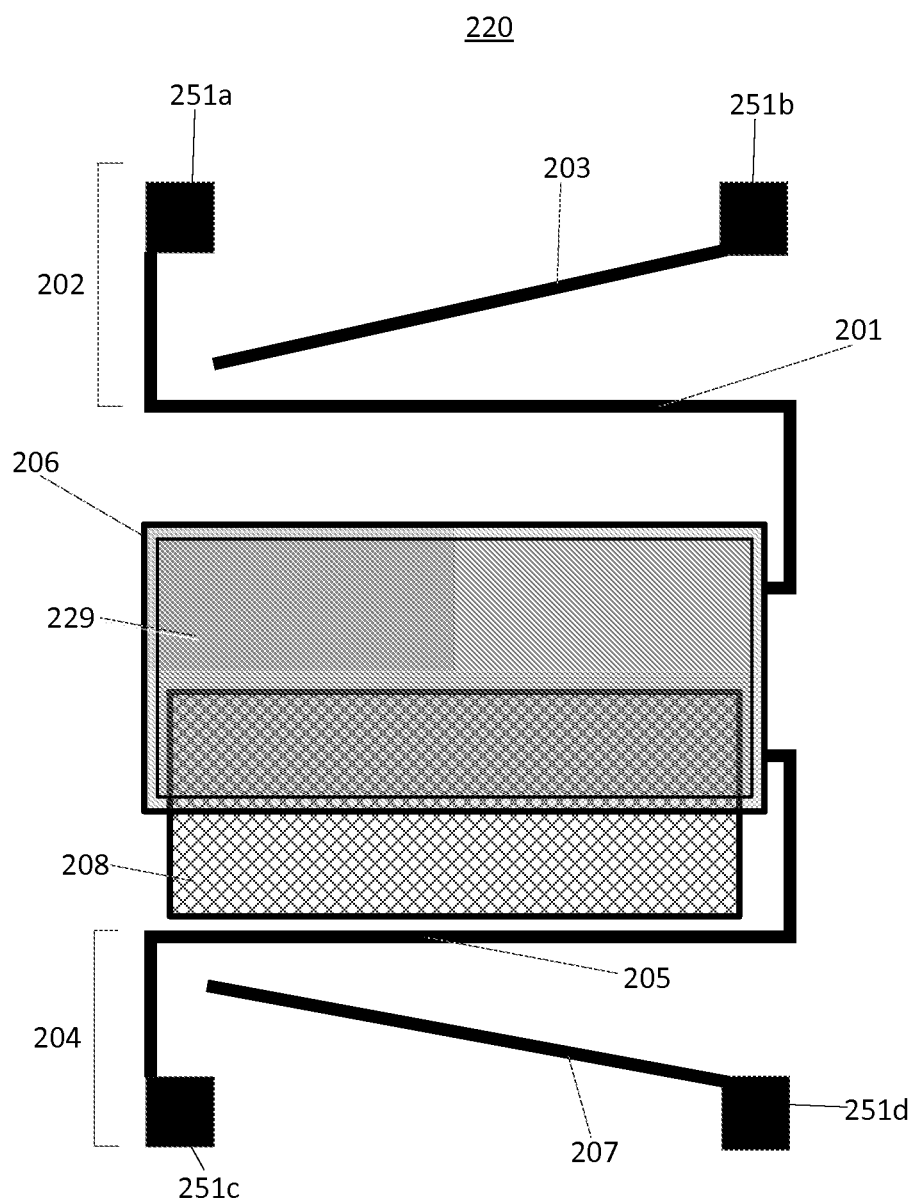

FIG. 2E shows a top view of a second alternative three-state shutter assembly 220. The shutter assembly 220 is similar to the shutter assembly 200 shown in FIGS. 2A-2C, except that the shutter assembly 220 includes a holding electrode 229 positioned beneath the shutter 206 instead of beside the shutter 206 as shown in FIGS. 2A-2C. FIG. 2E shows the shutter assembly 220 in a partially transmissive state. For illustrative purposes, the shutter 206 is depicted as transparent in FIG. 2E although it is substantially opaque in practice.

The shutter assembly 220 can be moved into a stable fully transmissive state by applying a voltage across the actuator 202, as discussed above in connection with FIG. 2C. Similarly, the shutter assembly 210 can be moved into a stable fully light obstructing state by applying a voltage across the actuator 204, as discussed above in connection with FIG. 2B. In the partially transmissive state shown in FIG. 2E, voltage is removed from both opposing actuators 202 and 204 and a voltage is applied to the holding electrode 229. The shutter 206 can be conductive, and can form an opposing electrode of an electrostatic actuator along with the holding electrode 229. In some implementations, the holding electrode 229 can be located on the surface of the substrate in which the aperture 208 is formed. In some other implementations, a display incorporating the shutter assembly 220 can include an opposing substrate, such that the shutter assembly 220 is positioned between the two substrates, and the holding electrode 229 can be located on a surface of the opposing substrate. The size of the holding electrode 229 can be selected to match the size of the shutter 206. The position of the holding electrode 229 is selected such that it aligns with the position of the shutter 206 in its desired neutral state, that is, the desired position of the shutter when no voltage is applied to the actuators 202 and 204 to achieve a desired level of partial transmissiveness. Such a configuration can help to reduce undesired movement of the shutter 206 in the partially transmissive state when a voltage is applied to the holding electrode 229.

As shown in FIG. 2E, the holding electrode 229 partially overlaps the aperture 208. To prevent the holding electrode 229 from obstructing the light that travels through the aperture 208, the holding electrode 229 can be formed from a transparent conductor. For example, in some implementations, the holding electrode 229 is formed from indium tin oxide (ITO). When a voltage is applied to the holding electrode 229, the shutter 206 can be held in a stable, partially transmissive state.

Figure 3A:
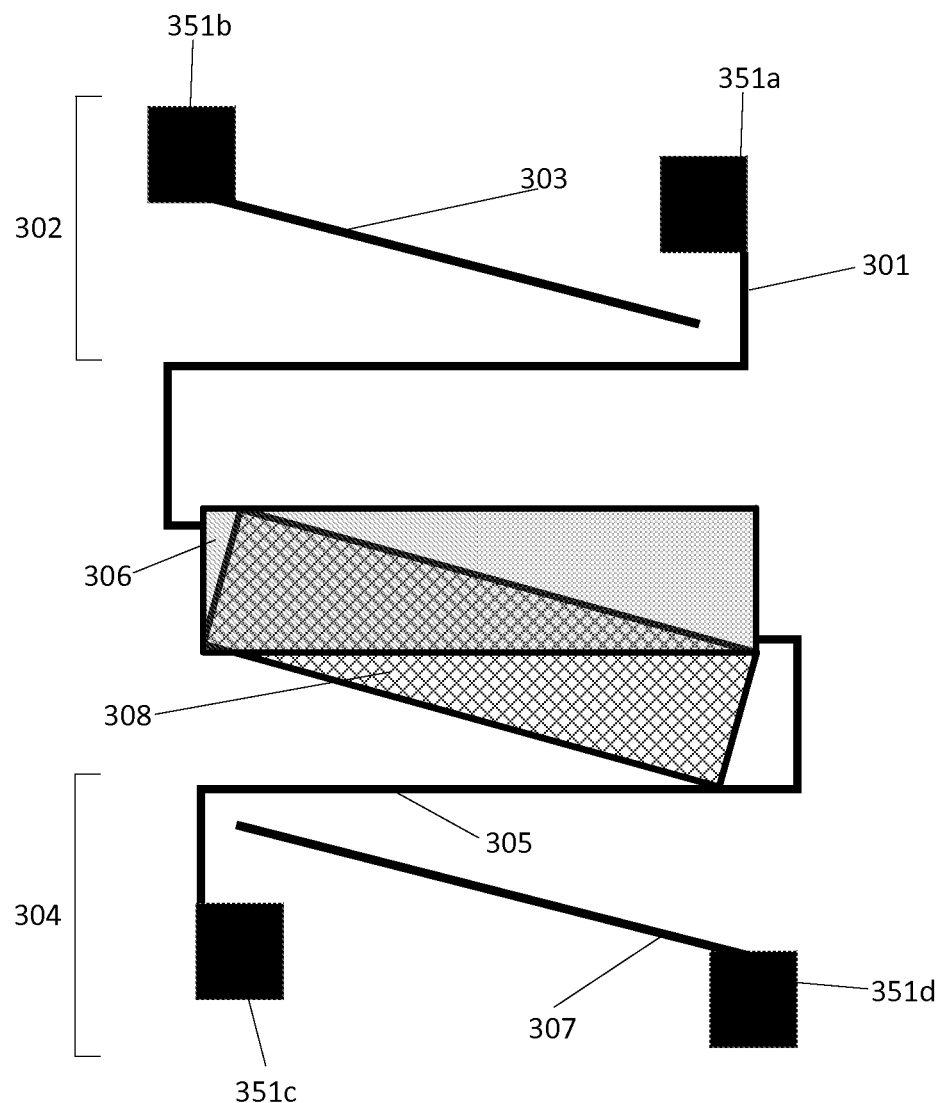
FIG. 3A shows a top view of an example three-state shutter assembly in a partially transmissive state.

FIG. 3A shows a top view of an example three-state shutter assembly 300 in a partially transmissive state. The shutter assembly 300 includes opposing actuators 302 and 304 coupled to a shutter 306. Each actuator 302 and 304 includes two beams 301 and 303, and 305 and 307, respectively. The beams 301 and 305 are coupled to diagonally opposite corners of the shutter 306. The beams 301 and 305 are also supported by the anchors 351a and 351c, respectively. The beams 303 and 307 are supported by the anchors 351b and 351d, respectively. The shutter assembly 300 also includes an aperture 308 formed in a substrate below the shutter 306. The shutter 306 is positioned above the aperture 308 and is depicted as being partially transparent for illustrative purposes, despite it being opaque in practice.

The shutter assembly 300 is shown in a neutral state in FIG. 3A, with neither of the opposing actuators 302 and 304 activated. As shown in FIG. 3A, the aperture 308 is arranged at an angle with respect to the shutter 306 such that the shutter 306 partially covers the aperture 308 in the neutral shutter assembly state. In some implementations, the angle formed between the shutter 306 and the aperture 308 is in the range of about 5 to about 15 degrees. In some other implementations, the angle formed between the shutter 306 and the aperture 308 is about 30 degrees, 45 degrees, 60 degrees, or any other angle. In some implementations, in the neutral state, the shutter 306 allows approximately 50% of the light passing through the aperture 308 to exit the display and contribute to the formation of an image. In some other implementations, the shutter assembly 300 is configured to allow different percentages of light to leave the display after passing through the aperture 308 in the neutral state. For example, the shutter assembly 300 can be configured to allow about 10%, 25%, 33%, 50%, 66%, 75%, 90%, or any other percentage of the light passing through the aperture 308 to leave this display while in this partially transmissive state. In some implementations, holding electrodes similar to the holding electrode 209, 219 or 229 shown in FIGS. 2A, 2D and 2E, respectively can be employed to keep the shutter 306 in its neutral position. The actuators 302 and 304 are compliant beam actuators, and operate in substantially the same manner as the actuators 202 and 204 shown in FIG. 2A and described above. In some implementations, the actuation of the actuators 302 and 304 can be controlled by a voltage driver. For example, the shutter assembly 300 can be an element of the array of light modulators 150 shown in FIG. 1B. The controller 134 can communicate instructions to the voltage driver 138 shown in FIG. 1B, which can then apply actuation voltages to the shutter assembly 300. Through such communication, the controller 134 can cause the actuators 302 and 304 of the shutter assembly 300 to achieve the neutral (or relaxed) partially transmissive state described immediately above, as well as a fully closed state, and a substantially open or light transmissive state described below.

Figure 3B:
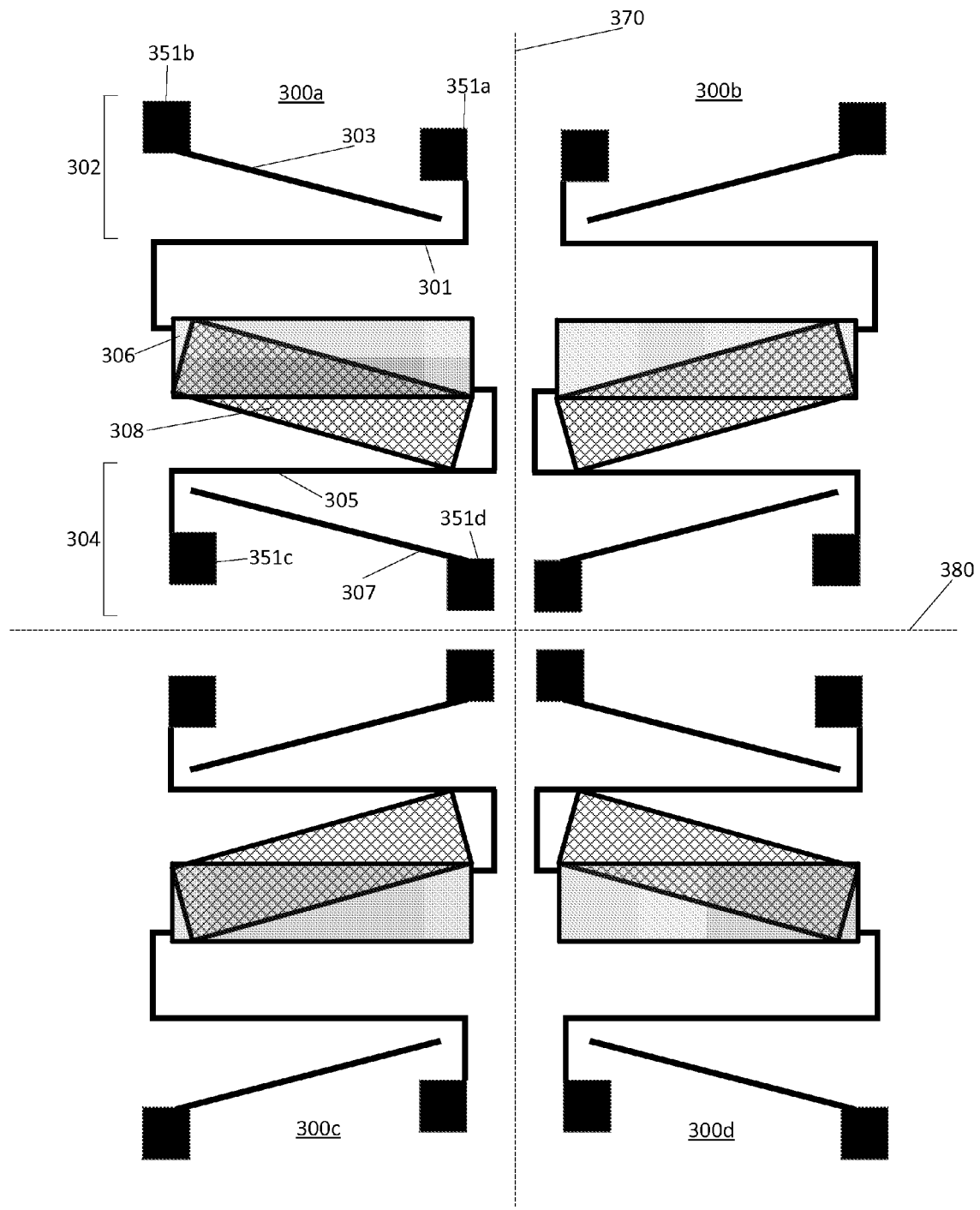
FIG. 3B shows an example array of the three-state shutter assemblies shown in FIG. 3A.

FIG. 3B shows an example array of the three-state shutter assemblies 300 shown in FIG. 3A. Shutter assemblies 300 in adjacent columns are separated by an vertical axis of adjacency 370 and shutter assemblies 300 in adjacent rows are separated by a horizontal axis of adjacency 380. Shutter assemblies in neighboring columns and rows can have apertures oriented at various angles with respect to the axes of the display. In some implementations, the shutter assemblies 300 represent pixels of a display, and all of the pixels in a first row can have apertures arranged at the same angle, while pixels in adjacent rows have their apertures arranged at an angle mirroring the angle of the apertures in the first row. For example, the angle of the aperture 308 of shutter assembly 300a is equal to the reflection over the horizontal axis of adjacency 380 of the angle of the aperture of the shutter assembly 300c. In some other implementations, all of the pixels in a column can have apertures arranged at the same angle, while pixels in adjacent columns have their apertures arranged at an angle mirroring the angle of the apertures in the first column. For example, the angle of the aperture 308 of shutter assembly 300a is equal to the reflection over the vertical axis of adjacency 370 of the angle of the aperture of the shutter assembly 300b. In some other implementations, apertures of shutter assemblies in adjacent rows or columns can all be arranged at the same angle. In some implementations, the angular orientation can provide improved view-angle uniformity for the display.

Figure 3C:
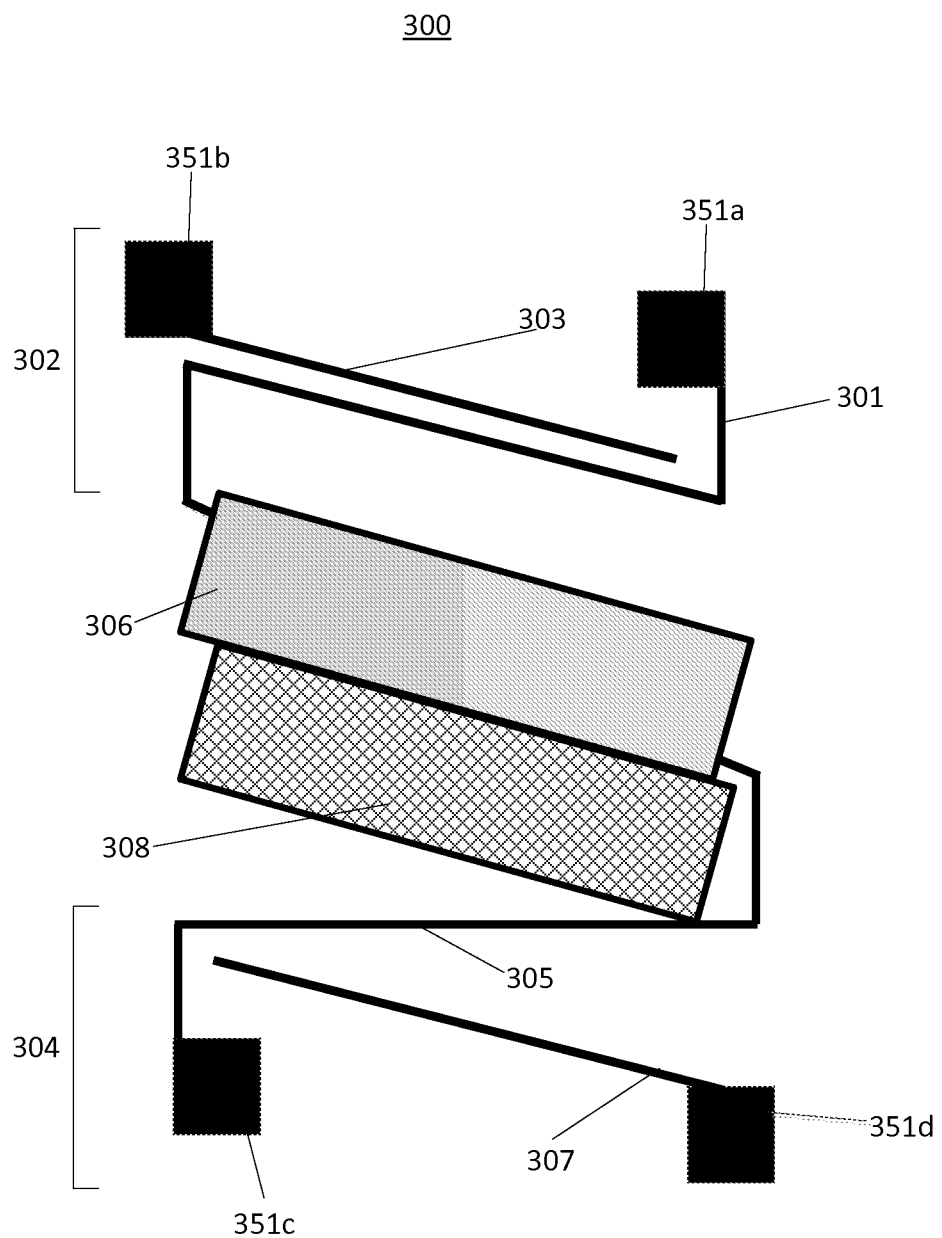
FIG. 3C shows a top view of the three-state shutter assembly shown in FIG. 3A in a substantially transmissive state.

FIG. 3C shows a top view of the three-state shutter assembly shown in FIG. 3A in a substantially transmissive state. In this state, no portion of the shutter 306 is positioned over the aperture 308. Therefore, substantially all of the light passing through the aperture 308 is able to escape from the display in which the shutter assembly 300 is used.

When a voltage is applied to the actuator 302 while the shutter 306 is in its neutral position, for example when transitioning from the neutral state shown in FIG. 3A to the state shown in FIG. 3C, the shutter 306 can move rotationally (and in some implementations translationally, as well) until it no longer obstructs the aperture 308. The original neutral position of the shutter 306 is shown in broken lines in FIG. 3C. While the shutter 306 is arranged at an angle with respect to the aperture 308 in the neutral position, in some implementations, the rotational motion attributable to the actuator 302 causes the shutter 306 to be aligned at substantially the same angle as the aperture 308 when the shutter 306 is moved into the fully transmissive state shown in FIG. 3C. The shutter 306 can remain stable in its fully transmissive state for as long as a voltage is applied across the actuator 302. When the shutter is to transition to a different state, the voltage can be removed from the actuator 302.

Figure 3D:
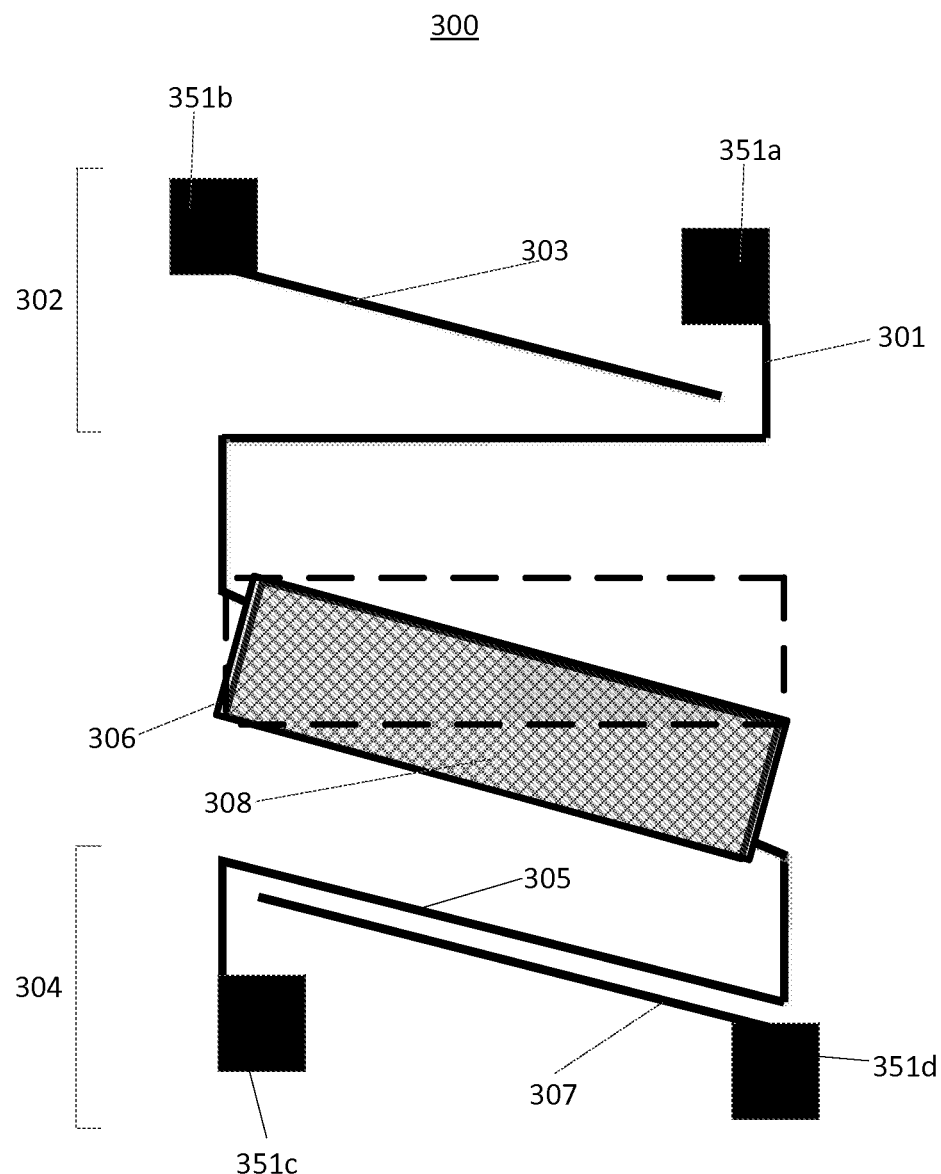
FIG. 3D shows a top view of the three-state shutter assembly shown in FIG. 3A in a fully light blocking state.

FIG. 3D shows a top view of the three-state shutter assembly 300 shown in FIG. 3A in a fully light blocking state. In the fully light blocking state, the shutter 306 is positioned directly over the aperture 308, preventing light passing through the aperture 308 from leaving the display apparatus.

When the shutter 306 is transitioned between its fully transmissive state shown in FIG. 3C and its fully light obstructing state shown in FIG. 3D, its movement can be primarily translational. As a result, the shutter 306 remains substantially aligned with the aperture 308 as it is relocated to cover the aperture 308 entirely. The original neutral position of the shutter 306 is shown in broken lines in FIG. 3D. When the shutter 306 moves between its fully light obstructing position shown in FIG. 3D and its partially transmissive state shown in FIG. 3A, the movement of the shutter 306 can be primarily rotational. Similarly, when the shutter moves between its fully transmissive state shown in FIG. 3C and its partially transmissive state shown in FIG. 3A, in some implementations, the movement of the shutter 306 also can be partially rotational and partially translational.

Figure 4A:
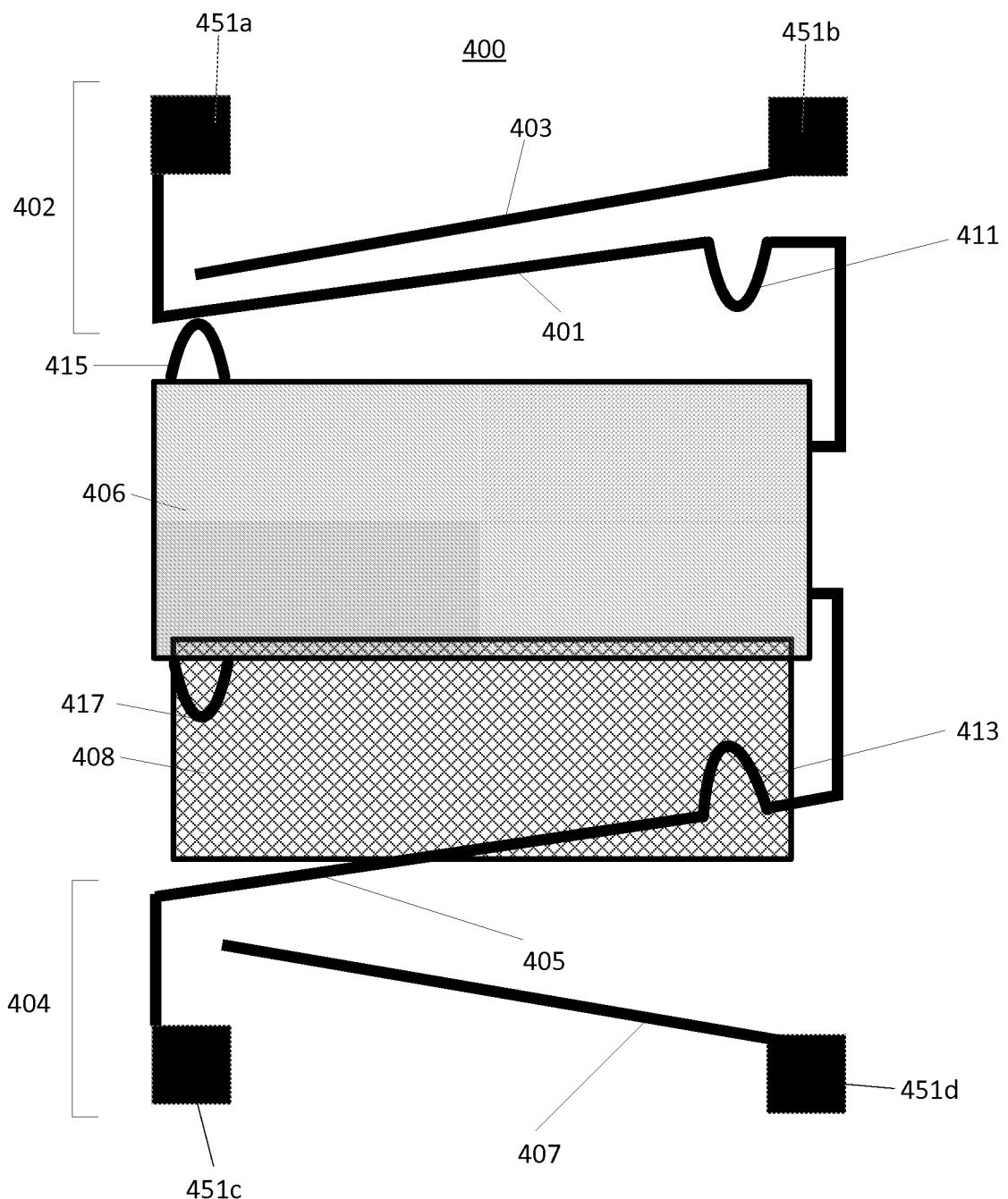
FIG. 4A shows a top view of another example three-state shutter assembly in a substantially transmissive state.

FIG. 4A shows a top view of another example three-state shutter assembly 400 in a substantially transmissive state. The shutter assembly 400 includes many of the features of the shutter assembly 200 shown in FIG. 2A and the shutter assembly 300 shown in FIG. 3A, such as opposing actuators 402 and 404 coupled to a shutter 406. Each actuator 402 and 404 includes two beams 401 and 403, and 405 and 407, respectively. Beam 401 is supported by anchor 451a, beam 403 is supported by anchor 451b, beam 405 is supported by anchor 451c, and beam 407 is supported by anchor 451d. The beam 401 includes a curved hinge 411, and the beam 405 includes a curved hinge 413. The shutter assembly 400 also includes an aperture 408. The shutter 406 is positioned above the aperture 408 and is configured to obstruct light when aligned with the aperture 408. The shutter 406 also includes two mechanical stops 415 and 417. In some implementations, the actuation of the actuators 402 and 404 can be controlled by a voltage driver. For example, the shutter assembly 400 can be an element of the array of light modulators 150 shown in FIG. 1B. The controller 134 can communicate instructions to the voltage driver 138 shown in FIG. 1B, which can then apply actuation voltages to the shutter assembly 400.

Through such communication, the controller 134 can cause the actuators 402 and 404 of the shutter assembly 400 to achieve a neutral (or relaxed) open or substantially transmissive state, a fully closed state, and a substantially open or light transmissive state described below.

The shutter assembly 400 is shown in a substantially transmissive state similar to that shown in FIG. 2C, with the actuator 402 actuated. The beams 401 and 403 form opposing electrodes of an electrostatic actuator that can be drawn towards each other when a voltage is applied across the actuator 402. The actuators 402 and 404 operate in substantially the same manner as the actuators 202 and 204 shown in FIG. 2A and described above.

The electrode 404 is not actuated to prevent an opposing force that would tend to pull the shutter 406 back over the aperture 408. In some implementations, the beams 401 and 405 are made from a flexible material that can deform when either of the actuators 402 and 404 are actuated to facilitate a zipping actuation motion. In the substantially transmissive state shown in FIG. 4A, the mechanical stop 415 can be in contact with the beam 401, preventing the shutter from moving further towards the actuator 402 and keeping the shutter at a desired angle with respect to the aperture 408.

Figure 4B:
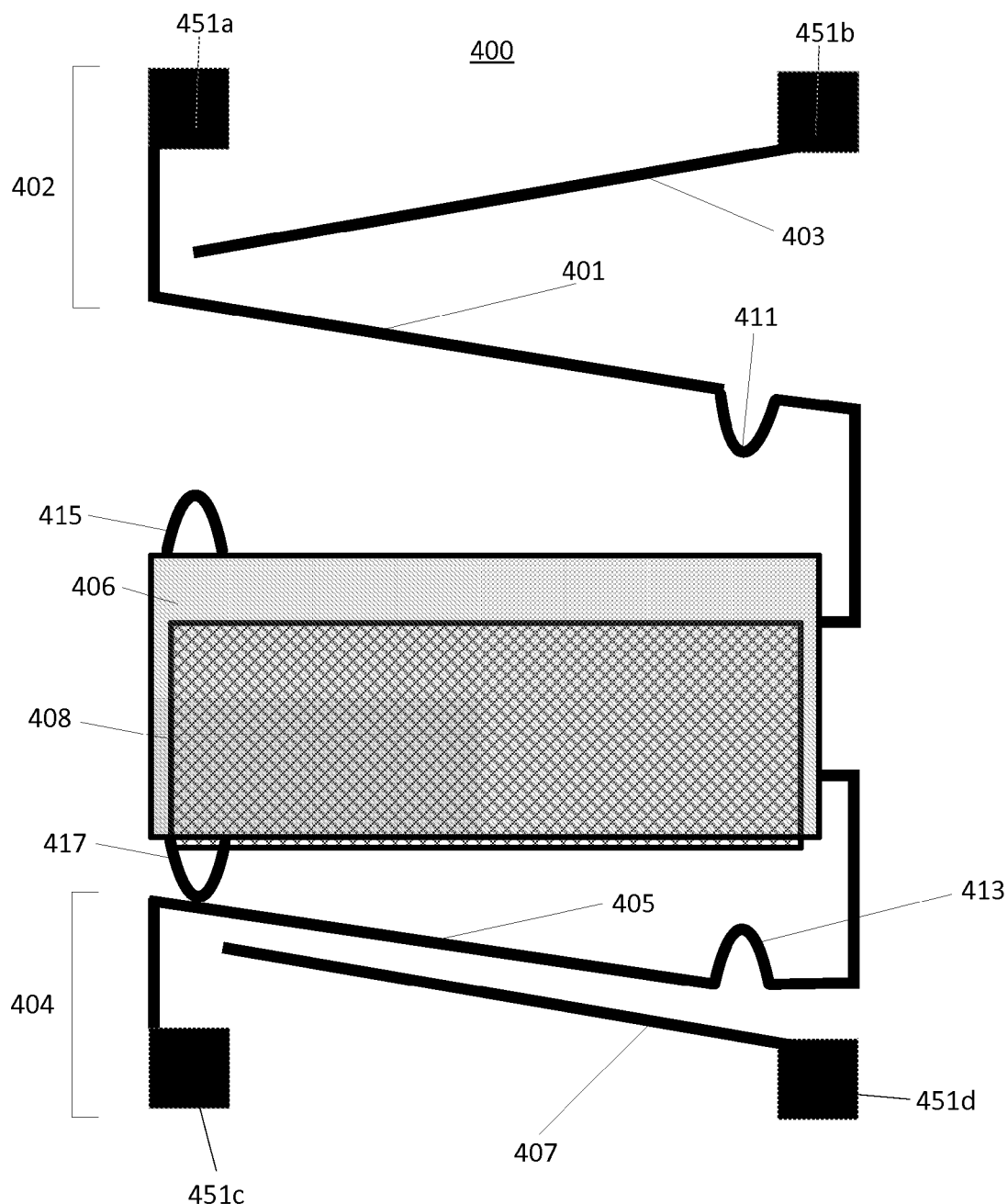
FIG. 4B shows a top view of the three-state shutter assembly shown in FIG. 4A in a fully light obstructing state.

FIG. 4B shows a top view of the three-state shutter assembly 400 shown in FIG. 4A in a fully light obstructing state. The shutter 406 is positioned directly over the aperture 408 so that none of the light passing through the aperture 408 is able to escape from the display in which the shutter assembly 400 is used. For illustrative purposes, the shutter 406 is depicted as transparent in FIG. 4B, despite it being substantially opaque in practice.

In some implementations, the beam 405 can bend at the hinge 413. Therefore, a voltage applied across the electrode 404 can cause the portion of the beam 405 distal to the hinge 413 with respect to the beam's connection with the shutter 406 to fully contact the beam 407, while the portion of the beam 405 proximal to the shutter 406 with respect to the hinge 413 remains separated from the beam 407. That is, the electrostatic force across the actuator 404 is not sufficient to fully overcome the stiffness of the beam 405 to bring the beams into full contact. In some implementations, the mechanical stop 417 is drawn into contact with the beam 405 when the shutter 406 is in its fully light obstructing state as shown in FIG. 4B to help ensure proper alignment with the aperture 408.

Figure 4C:
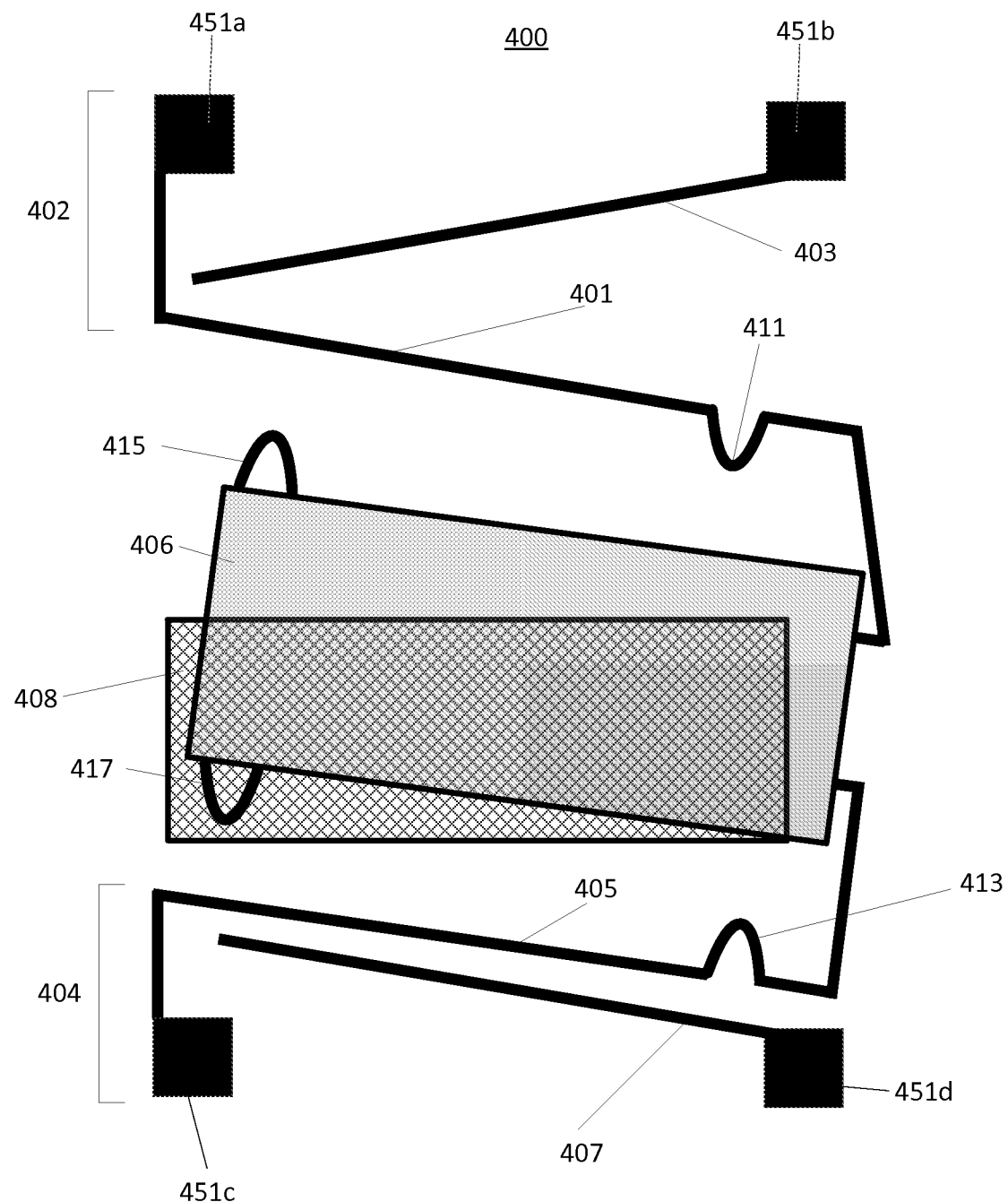
FIG. 4C shows a top view of the three-state shutter assembly shown in FIG. 4A in a partially transmissive state.

FIG. 4C shows a top view of the three-state shutter assembly 400 shown in FIG. 4A in a partially transmissive state. As in the fully light obstructing state shown in FIG. 4B, the actuator 404 is actuated in the partially transmissive state shown in FIG. 4C. However, in the partially transmissive state, the actuation voltage applied to the actuator 404 is greater than the first actuation voltage applied in the fully light obstructing state. In various implementations, the first actuation voltage can be between about 15 and about 45V and the second actuation voltage can be between about 3V to about 10V greater than the first voltage. As a result of the greater voltage, the electrostatic force on the beam 405 also can be proportionally greater.

The greater force on the beam 405 overcomes the stiffness of the beam 405, so that the portions of the beam 405 proximal to and distal to the shutter 406 are both brought into contact with the beam 407. When the right-hand portion of the beam 405 is pulled down into alignment with the beam 407, the shutter 406 experiences a rotational force. The result is that the shutter 406 is aligned at an angle with respect to the aperture 408, so that a portion of the aperture 408 remains unobstructed by the shutter 406.

In some implementations, in this over-actuated state, the shutter 406 allows approximately 50% of the light passing through the aperture 408 to exit the display and contribute to the formation of an image. In some other implementations, the shutter assembly 400 is configured to allow different percentages of light to leave the display after passing through the aperture 408 in the neutral state. For example, the shutter assembly 400 can be configured to allow about 10%, 25%, 33%, 50%, 66%, 75%, 90%, or any other percentage of the light passing through the aperture 408 to leave the display when the shutter assembly 400 is in a neutral position.

Figure 5:
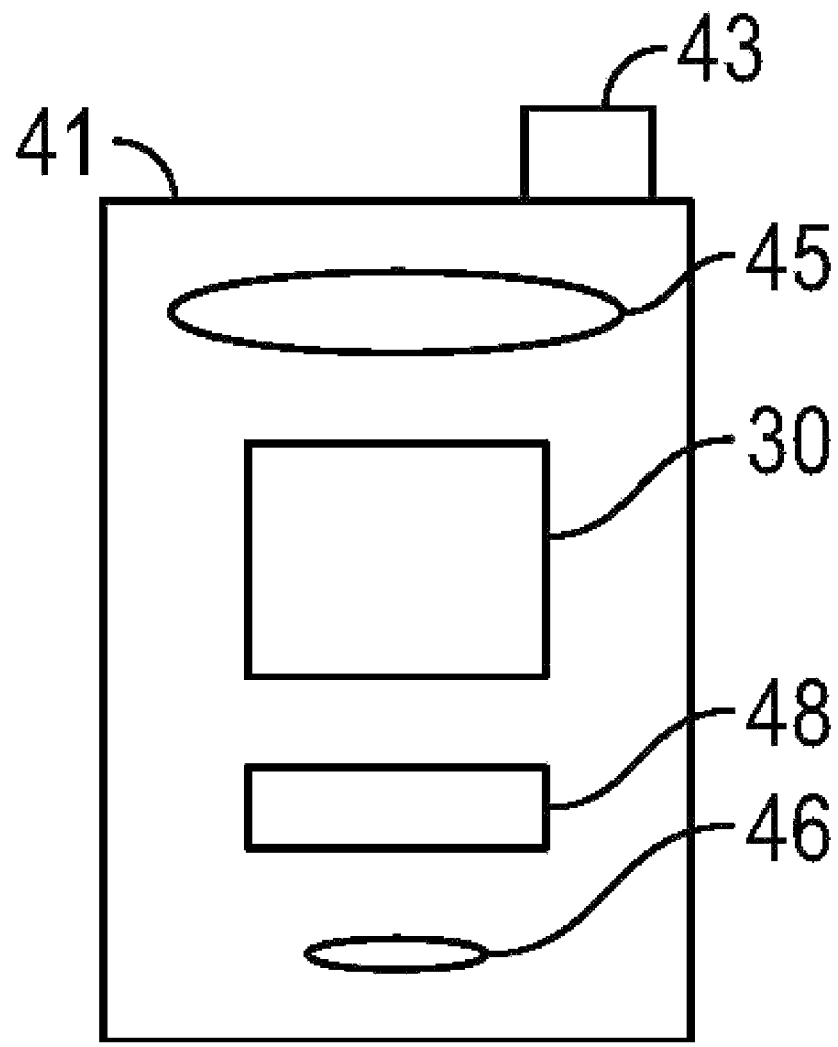
FIGS. 5 and 6 show system block diagrams of an example display device that includes a plurality of display elements.
Figure 6:
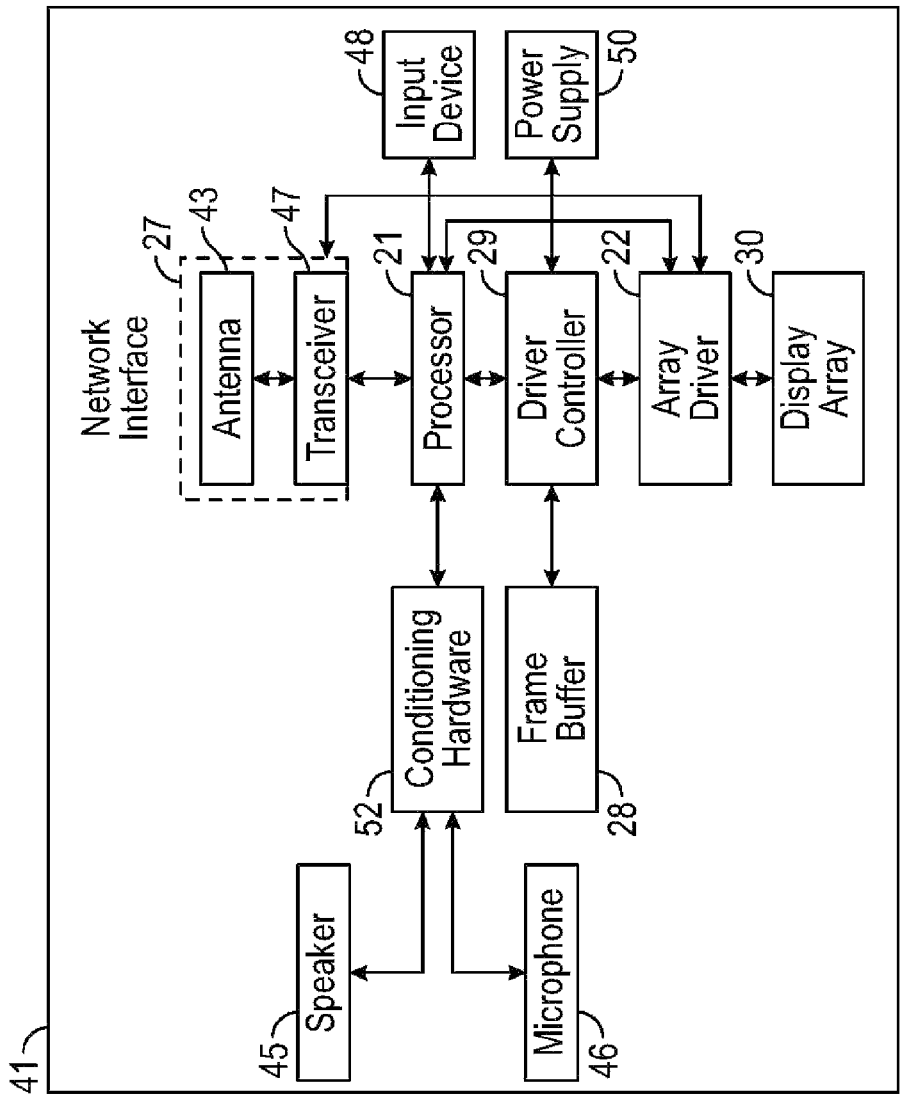

FIGS. 5 and 6 show system block diagrams of an example display device 40 that includes a plurality of display elements. The display device 40 can be, for example, a smart phone, a cellular or mobile telephone. However, the same components of the display device 40 or slight variations thereof are also illustrative of various types of display devices such as televisions, computers, tablets, e-readers, hand-held devices and portable media devices.

The display device 40 includes a housing 41, a display 30, an antenna 43, a speaker 45, an input device 48 and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, electroluminescent (EL) displays, OLED, super twisted nematic (STN) display, LCD, or thin-film transistor (TFT) LCD, or a non-flat-panel display, such as a cathode ray tube (CRT) or other tube device. In addition, the display 30 can include a mechanical light modulator-based display, as described herein.

The components of the display device 40 are schematically illustrated in FIG. 5. The display device 40 includes a housing 41 and can include additional components at least partially enclosed therein. For example, the display device 40 includes a network interface 27 that includes an antenna 43 which can be coupled to a transceiver 47. The network interface 27 may be a source for image data that could be displayed on the display device 40. Accordingly, the network interface 27 is one example of an image source module, but the processor 21 and the input device 48 also may serve as an image source module. The transceiver 47 is connected to a processor 21, which is connected to conditioning hardware 52. The conditioning hardware 52 may be configured to condition a signal (such as filter or otherwise manipulate a signal). The conditioning hardware 52 can be connected to a speaker 45 and a microphone 46. The processor 21 also can be connected to an input device 48 and a driver controller 29. The driver controller 29 can be coupled to a frame buffer 28, and to an array driver 22, which in turn can be coupled to a display array 30. One or more elements in the display device 40, including elements not specifically depicted in FIG. 5, can be configured to function as a memory device and be configured to communicate with the processor 21. In some implementations, a power supply 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 43 transmits and receives RF signals according to the Bluetooth® standard. In the case of a cellular telephone, the antenna 43 can be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that can be readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and grayscale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of display elements. In some implementations, the array driver 22 and the display array 30 are a part of a display module. In some implementations, the driver controller 29, the array driver 22, and the display array 30 are a part of the display module.

In some implementations, the driver controller 29, the array driver 22, and the display array 30 are appropriate for any of the types of displays described herein. For example, the driver controller 29 can be a conventional display controller or a bi-stable display controller (such as a mechanical light modulator display element controller). Additionally, the array driver 22 can be a conventional driver or a bi-stable display driver (such as a mechanical light modulator display element controller). Moreover, the display array 30 can be a conventional display array or a bi-stable display array (such as a display including an array of mechanical light modulator display elements). In some implementations, the driver controller 29 can be integrated with the array driver 22. Such an implementation can be useful in highly integrated systems, for example, mobile phones, portable-electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with the display array 30, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

As used herein, a phrase referring to "at least one of" a list of items refers to any combination of those items, including single members. As an example, "at least one of: a, b, or c" is intended to cover: a, b, c, a-b, a-c, b-c, and a-b-c.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus comprising:
a movable light obstructing component;
first and second actuators coupled to the apparatus and configured to move the light obstructing component between three states, including a fully light obstructive state, a substantially transmissive state, and a partially transmissive state, wherein at least one of the three states is a neutral state in which both the first and second actuators are in an unactuated state;
a third actuator, which when actuated, is configured to maintain the light obstructing component in the neutral state; and
a controller configured to control the first, second, and third actuators to selectively move the light obstructing component into each of the three states.

2. The apparatus of claim 1, wherein the third actuator includes an electrode positioned beside or below the position of the light obstructing component in the neutral state.

3. The apparatus of claim 2, wherein the third actuator is formed from a transparent conductor.

4. The apparatus of claim 2, further comprising a fourth actuator which, when actuated along with the third actuator, is configured to maintain the light obstructing component in the neutral state.

5. The apparatus of claim 1, wherein the first and second actuators are configured to impart opposing rotational forces on the light obstructing component substantially within a plane parallel to a substrate over which the light obstructing component is supported when moving the shutter between the partially transmissive state and at least one of the substantially transmissive state and the fully light obstructive state.

6. The apparatus of claim 5, wherein the first and second actuators are further configured to impart opposing linear forces on the light obstructing component substantially within a plane parallel to a substrate over which the light obstructing component is supported when moving the shutter between the substantially transmissive state and the fully light obstructive state.

7. The apparatus of claim 5, wherein the first actuator includes a first compliant beam electrode coupled to a first corner of the light obstructing component and the second actuator includes a second compliant beam electrode coupled to a second corner of the light obstructing component, wherein the first corner and second corner are diagonally opposite to one another on the light obstructing component.

8. The apparatus of claim 7, further comprising a third actuator, which when actuated, is configured to maintain the light obstructing component in the neutral state.

9. The apparatus of claim 8, wherein the third actuator includes an electrode positioned beside or below the position of the light obstructing component in the neutral state.

10. The apparatus of claim 8, further comprising a fourth actuator which, when actuated along with the third actuator, is configured to maintain the light obstructing component in the neutral state.

11. The apparatus of claim 1, wherein the first and second actuators are configured to rotate the light obstructing component relative to a first aperture, wherein the first aperture is arranged at an angle with respect to an axis of a display apparatus in which the apparatus is incorporated.

12. The apparatus of claim 11, wherein the first light obstructing component is included in a first pixel, the apparatus further including:
a second light obstructing component in a second pixel adjacent to the first pixel,
a third actuator and a fourth actuator configured to rotate the second light obstructing component relative to a second aperture, wherein the second aperture is arranged at a angle with respect to the display apparatus axis and the angle of the second aperture is a mirror image of the angle of the first aperture across an axis of adjacency separating the first and second pixels.

13. The apparatus of claim 1, further comprising:
a display;
a processor that is configured to communicate with the display, the processor being configured to process image data; and
a memory device that is configured to communicate with the processor.

14. The apparatus of claim 1, further comprising:
a driver circuit configured to send at least one signal to a display; and
a controller configured to send at least a portion of the image data to the driver circuit.

15. The apparatus of claim 1, further comprising:
an image source module configured to send image data to a processor, wherein the image source module comprises at least one of a receiver, a transceiver, and a transmitter.

16. The apparatus of claim 1, further comprising an input device configured to receive input data and to communicate the input data to a processor.

17. An apparatus comprising:
a movable light obstructing component;
first and second actuators coupled to the apparatus and configured to move the light obstructing component linearly between a first state and a second state and rotationally between the second state and a third state; and
wherein the first state is a substantially transmissive state, the second state is a fully light obstructive state, and the third state is a partially transmissive state, and wherein the substantially transmissive state is achieved by applying a first voltage to the first actuator, the fully light obstructing state is achieved by applying a second voltage to the second actuator, and the partially transmissive state is achieved by applying a third voltage to the second actuator, and wherein the third voltage is greater than the second voltage.

18. The apparatus of claim 17, wherein the first and second actuators each include a compliant beam electrode having a hinge coupling a load beam of the electrode to the light obstructing component.

19. The apparatus of claim 17, further comprising first and second mechanical stops coupled to the light obstructing component, wherein the first and second mechanical stops are configured to restrict the motion of the light obstructing component towards the first and second actuators, respectively.

20. The apparatus of claim 17, wherein the third actuator includes an electrode positioned beside or below the position of the light obstructing component in the neutral state.

21. The apparatus of claim 17, wherein the third actuator is formed from a transparent conductor.

22. The apparatus of claim 17, comprising a fourth actuator which, when actuated along with the third actuator, is configured to maintain the light obstructing component in the neutral state.

23. The apparatus of claim 17, wherein the first actuator includes a first compliant beam electrode coupled to a first corner of the light obstructing component and the second actuator includes a second compliant beam electrode coupled to a second corner of the light obstructing component, wherein the first corner and second corner are diagonally opposite to one another on the light obstructing component.

24. The apparatus of claim 23, further comprising a third actuator, which when actuated, is configured to maintain the light obstructing component in the neutral state.

25. The apparatus of claim 23, wherein the third actuator includes an electrode positioned beside or below the position of the light obstructing component in the neutral state.

26. The apparatus of claim 23, further comprising a fourth actuator which, when actuated along with the third actuator, is configured to maintain the light obstructing component in the neutral state.

27. The apparatus of claim 23, wherein the first and second actuators are configured to rotate the light obstructing component relative to a first aperture, wherein the first aperture is arranged at an angle with respect to an axis of a display apparatus in which the apparatus is incorporated.

* * * * *